US011726326B1

(12) United States Patent
Travis et al.

(10) Patent No.: US 11,726,326 B1
(45) Date of Patent: Aug. 15, 2023

(54) WEDGE LIGHT GUIDE

(71) Applicant: META PLATFORMS TECHNOLOGIES, LLC, Menlo Park, CA (US)

(72) Inventors: Adrian Travis, Paris (FR); Babak Amirsolaimani, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 451 days.

(21) Appl. No.: 16/899,455

(22) Filed: Jun. 11, 2020

(51) Int. Cl.
*G02B 27/01* (2006.01)
*F21V 8/00* (2006.01)
*G02B 27/00* (2006.01)
*G03H 1/02* (2006.01)

(52) U.S. Cl.
CPC ....... *G02B 27/0172* (2013.01); *G02B 6/0056* (2013.01); *G02B 27/0012* (2013.01); *G03H 1/0248* (2013.01); *G02B 2027/0174* (2013.01); *G02B 2027/0178* (2013.01)

(58) Field of Classification Search
CPC ............ G02B 27/0172; G02B 27/0012; G02B 6/0056; G02B 2027/0174; G02B 2027/0178; G03H 1/0248
USPC .......................................................... 359/34
See application file for complete search history.

(56) References Cited

U.S. PATENT DOCUMENTS

| | | | | |
|---|---|---|---|---|
| 6,023,373 A | * | 2/2000 | Inoguchi | G02B 27/0172 349/11 |
| 6,094,241 A | * | 7/2000 | Yamazaki | G02B 27/0172 359/629 |
| 6,130,784 A | * | 10/2000 | Takahashi | H04N 5/7491 348/E5.145 |
| 6,335,838 B1 | * | 1/2002 | Kasai | G02B 27/0172 359/834 |
| 7,411,734 B2 | * | 8/2008 | Magarill | G02B 27/149 348/338 |
| 9,025,253 B2 | * | 5/2015 | Hadad | G02B 27/0101 362/626 |
| 9,523,852 B1 | * | 12/2016 | Brown | G02B 27/4211 |
| 9,958,684 B1 | * | 5/2018 | Robbins | G02B 27/0081 |
| 11,022,793 B2 | * | 6/2021 | Schowengerdt | H04N 9/3129 |
| 11,199,710 B2 | * | 12/2021 | Wheelwright | G02B 27/0172 |
| 11,237,402 B2 | * | 2/2022 | Wheelwright | G02B 5/10 |
| 11,269,131 B2 | * | 3/2022 | Peng | G02B 27/0172 |
| 11,391,948 B2 | * | 7/2022 | Peng | G02B 27/0172 |
| 11,460,699 B2 | * | 10/2022 | Hong | G02B 27/0101 |

(Continued)

FOREIGN PATENT DOCUMENTS

WO  WO-2021066992 A1 * 4/2021 ............ G01S 7/4817

*Primary Examiner* — Collin X Beatty
(74) *Attorney, Agent, or Firm* — Morgan, Lewis & Bockius LLP

(57) ABSTRACT

An optical device includes an optical assembly having a first end and a second end, the optical assembly including a first optical component and a second optical component, the first optical component having at least a first optical surface, a second optical surface, and a third optical surface that are non-parallel to one another. The first optical surface is curved and extends between the first end and the second end. A first polarization selective redirector is located between the first optical component and the second optical component, and a first polarization rotating redirector is disposed at the second end.

15 Claims, 17 Drawing Sheets

(56) References Cited

U.S. PATENT DOCUMENTS

| | | | |
|---|---|---|---|
| 2003/0030912 A1* | 2/2003 | Gleckman | G02B 27/0172 359/638 |
| 2004/0109208 A1* | 6/2004 | Amanai | G02B 17/0816 359/13 |
| 2007/0064310 A1* | 3/2007 | Mukawa | G02B 17/086 348/E5.145 |
| 2015/0378074 A1* | 12/2015 | Kollin | G02B 5/3016 359/485.05 |
| 2016/0154244 A1* | 6/2016 | Border | G02B 30/34 359/630 |
| 2016/0170209 A1* | 6/2016 | Border | G06F 3/012 359/631 |
| 2017/0343816 A1* | 11/2017 | Bietry | G02B 17/086 |
| 2018/0074331 A1* | 3/2018 | Ouderkirk | G02B 27/142 |
| 2018/0088325 A1* | 3/2018 | Brown | G02B 27/30 |
| 2019/0025590 A1* | 1/2019 | Haddick | G02B 27/141 |
| 2020/0292816 A1* | 9/2020 | Liu | G02B 27/0172 |
| 2020/0319462 A1* | 10/2020 | Schneider | G02B 27/144 |
| 2021/0286124 A1* | 9/2021 | Peng | G02B 5/3083 |
| 2021/0302746 A1* | 9/2021 | Gao | G02B 27/0172 |
| 2021/0364808 A1* | 11/2021 | Koshelev | G02B 26/0833 |
| 2022/0155513 A1* | 5/2022 | Peng | G02F 1/133541 |
| 2022/0229303 A1* | 7/2022 | Dai | G02B 27/0172 |

* cited by examiner

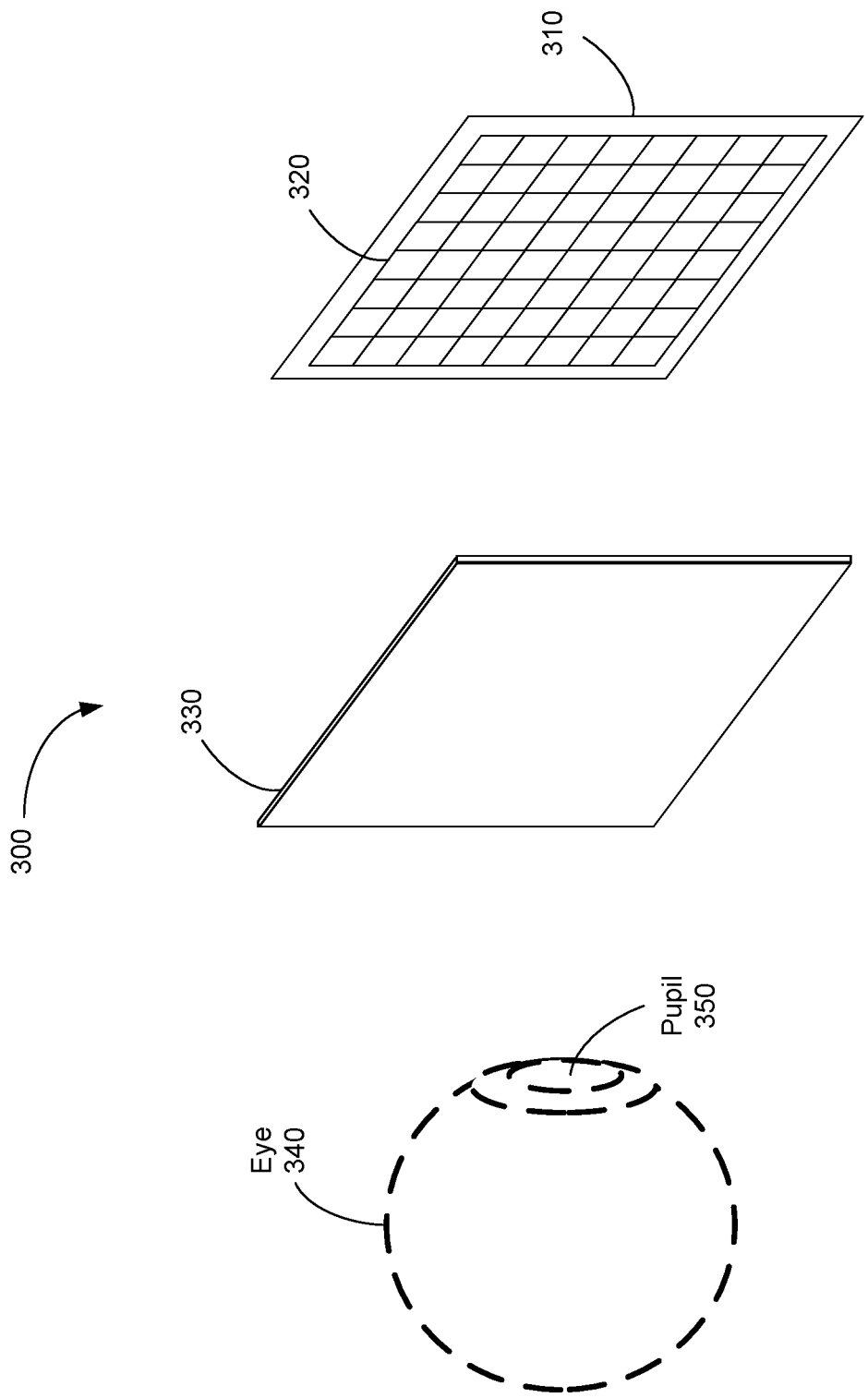

WEDGE LIGHT GUIDE

TECHNICAL FIELD

This description relates generally to head-mounted display devices, and more specifically to optical components used in head-mounted display devices.

BACKGROUND

Head-mounted display devices (also called herein head-mounted displays) are gaining popularity as a means for providing visual information to users.

However, the size and weight of conventional head-mounted display device have limited application of head-mounted display devices.

SUMMARY

Accordingly, there is a need for head-mounted display devices that are more compact and lightweight. Compact and lightweight head-mounted display devices would also improve user satisfaction with such devices.

In some augmented reality devices or systems, a light guide is used in conjunction with a video projector (e.g., a combination of a display and one or more lenses, etc.) to allow pupil expansion while the video projector is placed out of a field of view of an eye so as not to block the view of the outside world. For example, in order to allow a virtual image to emerge from spectacles (e.g., glasses) that are transparent to the outside world, opaque elements may be placed at the rim of the spectacles. Light guides and gratings may transfer the image from the rim across the eye piece.

When a wedge shaped light guide is used, a substantially flat guide (or "slab") of an approximately constant thickness may be inserted so as to reduce breakup of a projected image (e.g., all rays from the projector exit the light guide from a same surface, because the rays may undergo the same number of reflections within the light guide before exit).

The disclosed devices, systems, and methods allow projection within a light guide that is more compact than a linear combination of a slab from a wedge (e.g., the disclosed light guide may have a length that is substantially similar to that of a wedge). The guide may include a polarization selective redirector positioned at a slanted angle (e.g., relative to a plane substantially parallel to the guide). The polarization selective redirector is transparent to rays from the projector having a first polarization state but reflects rays in a second polarization state orthogonal to the first polarization state. After redirection (e.g., reflection) of the rays by the polarization rotating redirector, the redirected (e.g., reflected) rays propagate within a wedge defined by the polarization selective redirector instead of the entire light guide and emerge from the light guide. As a result, the light guide may operate first as a slab for an incoming light having a particular polarization, and subsequently as a wedge for returning light when the polarization of the returning light has been rotated by a polarization rotating redirector.

In accordance with some embodiments, an optical device includes an optical assembly having a first end and a second end and a first polarization rotating redirector disposed at the second end. The optical assembly includes: a first optical component and a second optical component, the first optical component having at least a first optical surface, a second optical surface, and a third optical surface that are non-parallel to one another, the first optical surface being curved and extending between the first end and the second end; and a first polarization selective redirector located between the first optical component and the second optical component.

In some embodiments, the first polarization selective redirector transmits rays having a first polarization and redirects (e.g., reflects or diffracts) rays having a second polarization orthogonal to the first polarization.

In some embodiments, the third surface of the first optical component is flat and the first polarization selective redirector is flat and in contact with the third surface of the first optical component.

In some embodiments, rays enter the optical assembly at an entry port defined between the first end and the second end of the optical assembly.

In some embodiments, the second optical component has at least a first optical surface, a second optical surface, and a third optical surface that are non-parallel to one another, the first optical surface of the second optical component extending between the first end and the second end, and the first optical surface of the first optical component and the first optical surface of the second optical component have a corresponding curved surface profile.

In some embodiments, the third surface of the first optical component is curved and the first polarization selective redirector is curved and in contact with the third surface of the first optical component.

In some embodiments, the second optical component has at least a first optical surface, a second optical surface, and a third optical surface that are non-parallel to one another, the first optical surface of the second optical component extending between the first end and the second end; and the optical assembly further includes a second polarization selective redirector having a shape identical to a shape of the first polarization selective redirector.

In some embodiments, each of the third optical surface of the first polarization selective redirector and the third optical surface of the second polarization selective redirector includes a concave surface.

In some embodiments, a curvature of the first polarization selective redirector is described by an even polynomial.

In some embodiments, the second optical component has at least a first optical surface, a second optical surface, and a third optical surface that are non-parallel to one another, the first optical surface of the second optical component extending between the first end and the second end; and rays entering the optical assembly at the first end alternatingly reflect off between the first optical surface of the first optical component and the first optical surface of the second optical component.

In some embodiments, the rays reflecting off the first optical surface of the first optical component is transmitted through the first polarization selective redirector before reflecting off the first optical surface of the second optical component.

In some embodiments, the first polarization rotating redirector is configured to redirect (e.g., reflect) and change a polarization of the rays.

In some embodiments, the first polarization selective redirector is configured to redirect (e.g., reflect) rays that are redirected (e.g., reflected) by the first polarization rotating redirector so that the rays redirected (e.g., reflected) by the first polarization rotating redirector alternatingly reflect off the first surface of the first optical component and the first polarization selective redirector.

In some embodiments, the optical device further includes a second polarization rotating redirector disposed at the first end of the optical assembly; a second polarization selective redirector disposed between the first polarization selective redirector and the second optical component; and a redirecting surface disposed near the first surface of the second optical component. The second polarization rotating redirector is configured to redirect (e.g., reflect) a second bundle of rays entering the optical assembly at the second end. The second bundle of rays alternatingly reflects off the first surface of the second optical component and the second polarization selective redirector. The redirecting surface is configured to redirect the second bundle of rays that has exited the second optical component back toward the first optical surface of the first optical component.

In some embodiments, the optical device further includes a volume hologram disposed adjacent to the first optical surface of the first optical component, the volume hologram configured to redirect (e.g., diffract) rays emerging from the first optical surface of the first optical component toward a user's eye.

In some embodiments, the volume hologram has cylindrical optical power and is configured to direct the rays emerging from the first optical surface of the first optical component as parallel rays toward the user's eye.

In some embodiments, the optical device further includes a display positioned at the first end of the optical assembly, the display configured to direct rays into the optical assembly through the first end.

In accordance with some embodiments, a method of determining a shape of an optical assembly includes calculating a first number of reflections of a first ray entering a slab portion of an optical assembly at a critical angle between a first surface and a second surface prior to exiting the slab portion at a first position; determining, by extending beyond the first position, a wedge portion of the optical assembly for a plurality of pilot rays at incident angles greater than the critical angle, the wedge portion having a curved slope so that a respective one of the plurality of pilot rays exits the wedge portion of the optical assembly after the first number of reflections; and adjusting the slab portion based on the curved slope of the wedge portion to form an updated slab portion having curved first and second surfaces so that the plurality of pilot rays exits the optical assembly after the first number of reflections.

In some embodiments, adjusting the slab portion based on the curved slope of the wedge portion to form an updated slab portion comprises adding a bulge portion of the curved slope of the wedge portion to the first surface of the slab portion and the second surface of the slab portion to form the updated slab portion.

In some embodiments, adjusting the slab portion based on the curved slope of the wedge portion to form an updated slab portion includes fitting an even polynomial to the wedge portion and extrapolating the even polynomial over the slab portion so that the first surface of the slab portion corresponds to the even polynomial. The method further includes determining a bulge portion on the first surface of the slab portion; subtracting half of the bulge portion from the first surface of the slab portion; and adding the half of the bulge portion to the second surface of the slab portion.

Thus, the disclosed embodiments provide devices and methods that enable more compact and lightweight head-mounted display devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
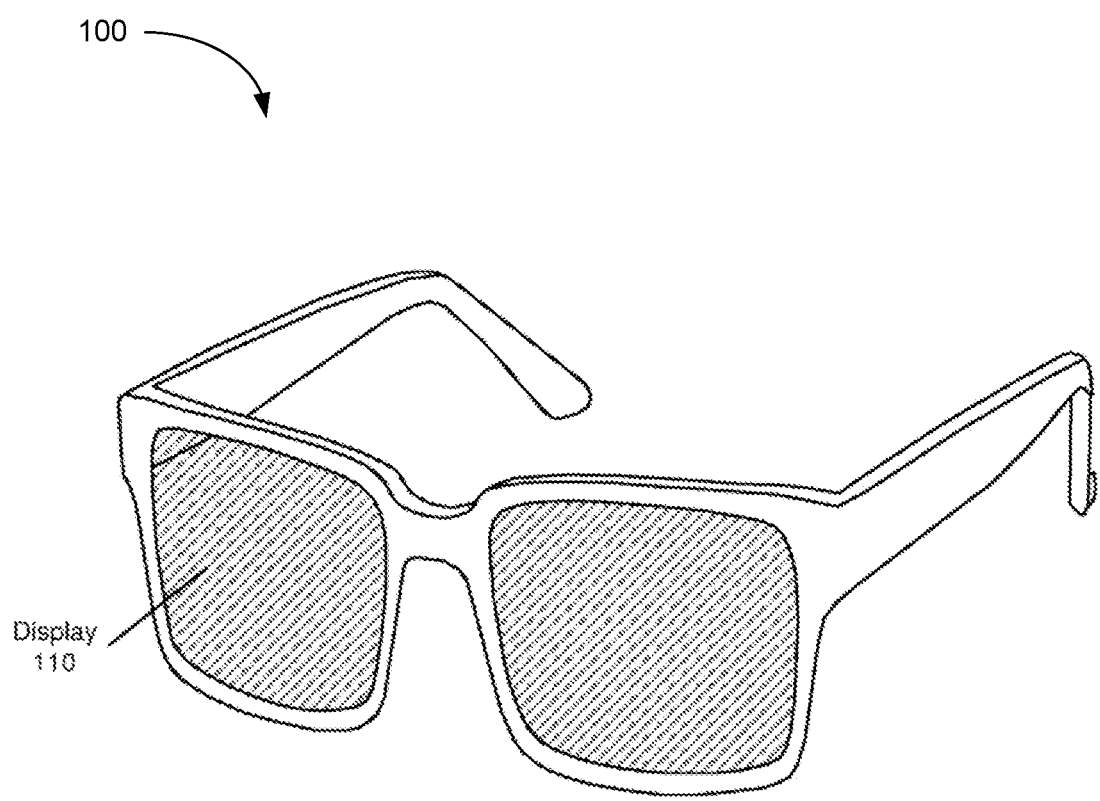
FIG. 1 is a perspective view of a display device in accordance with some embodiments.

These figures are not drawn to scale unless indicated otherwise.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first region could be termed a second region, and, similarly, a second region could be termed a first region, without departing from the scope of the various described embodiments. The first region and the second region are both regions, but they are not the same region.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Embodiments described herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on a head of a user or to be included as part of a helmet or headset, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual content (e.g., augmented reality content, virtual reality content, mixed reality content, or any combination thereof) to a user.

In some embodiments, display device 100 includes one or more components described below with respect to FIG. 2. In some embodiments, display device 100 includes additional components not shown in FIG. 2.

Figure 2:
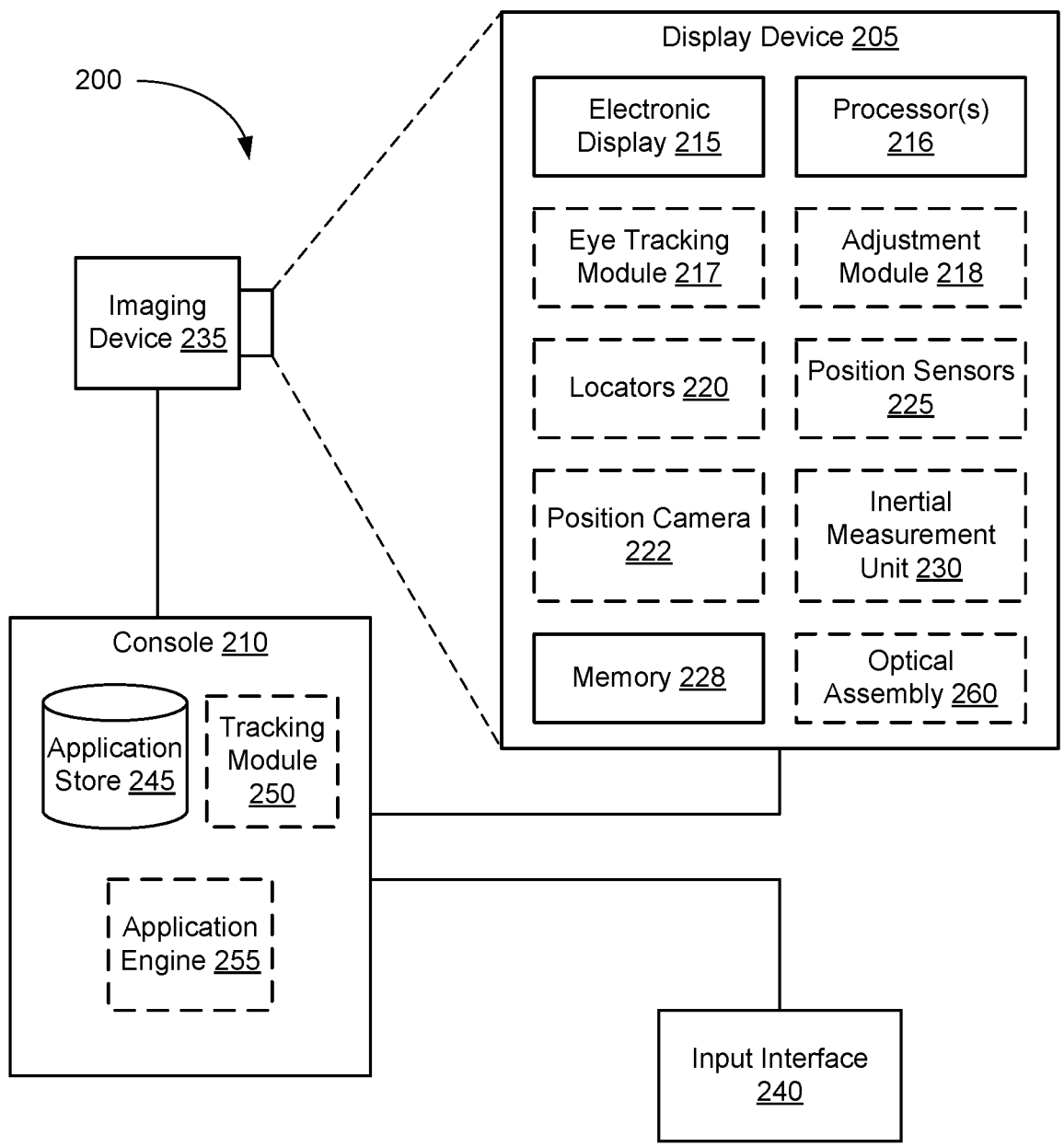
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having an associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and/or augmented reality.

In some embodiments, as shown in FIG. 1, display device 205 is a head-mounted display that presents media to a user. Examples of media presented by display device 205 include one or more images, video, audio, haptics, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 can augment views of a physical, real-world environment with computer-generated elements (e.g., images, video, sound, haptics, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, optical assembly 260, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted through each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display such that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is optionally configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and one or more lenses 330. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR). In some embodiments, a microLED includes an LED with an emission area characterized by a representative dimension (e.g., a diameter, a width, a height, etc.) of 100 µm or less (e.g., 50 µm, 20 µm, etc.). In some embodiments, a microLED has an emission area having a shape of a circle or a rectangle.

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lenses 330. In some embodiments, display device 300 uses the emission intensity array to facilitate providing image light to a location of pupil 350 of eye 340 of a user, and minimize the amount of image light provided to other areas in the eyebox.

One or more lenses 330 receive the modified image light (e.g., attenuated light) from the emission intensity array (or directly from emission device array 310), and shifted by one or more beam shifters 360, and direct the shifted image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

Figure 4A:
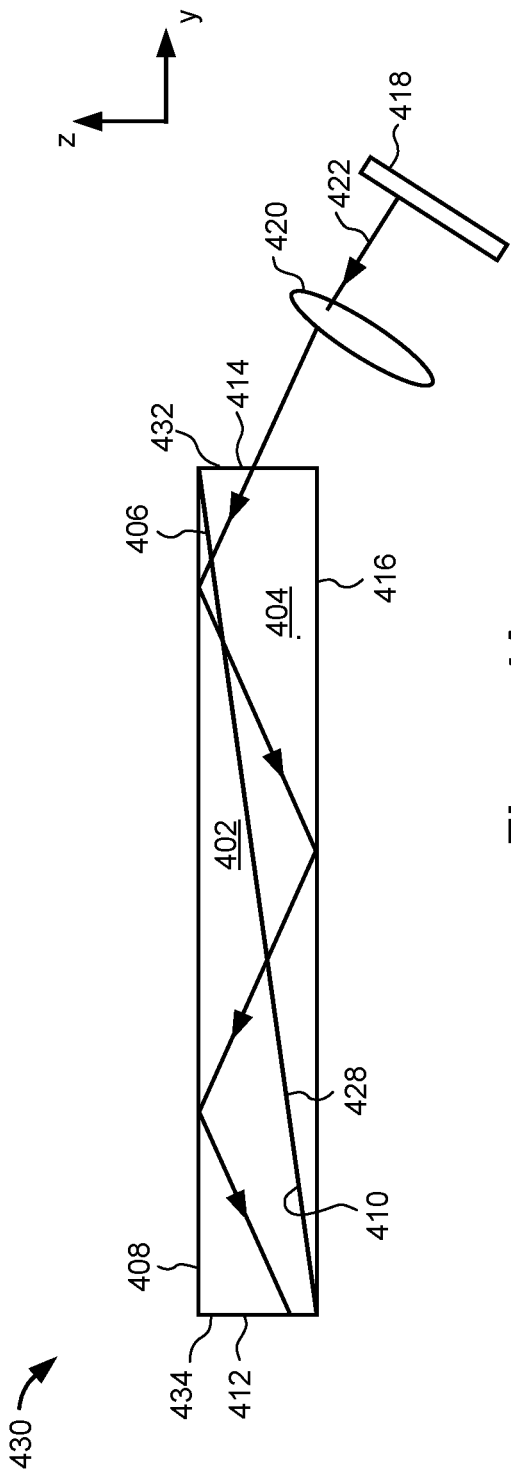
FIG. 4A is a schematic diagram illustrating a wedge light guide in accordance with some embodiments.

FIG. 4A is a schematic diagram illustrating a wedge light guide in accordance with some embodiments. The wedge light guide may be included in a head-mounted display device. In FIG. 4A, the wedge light guide is an optical assembly 430 that includes a first optical component 402 and a second optical component 404. The first optical component 402 includes a first optical surface 408, a second optical surface 410, and a third optical surface 412. The first optical surface 408, the second optical surface 410, and the third optical surface 412 are non-parallel to one another. The second optical component 404 includes a first optical surface 416, a second optical surface 428, and a third optical surface 414. The first optical surface 416, the second optical surface 428, and the third optical surface 414 are non-parallel to one another.

Figure 4B:
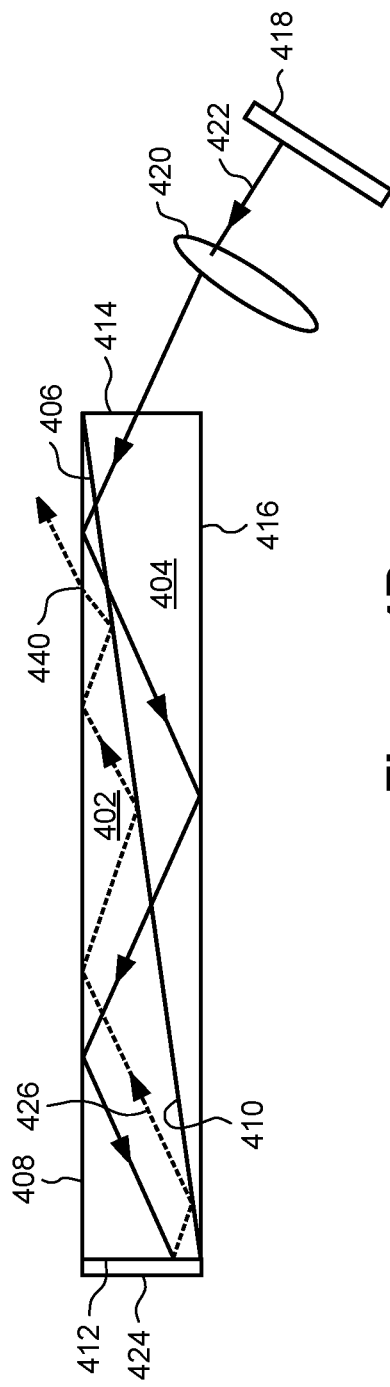
FIG. 4B is a schematic diagram illustrating a return path of a ray in the wedge light guide of FIG. 4A.
Figure 4C:
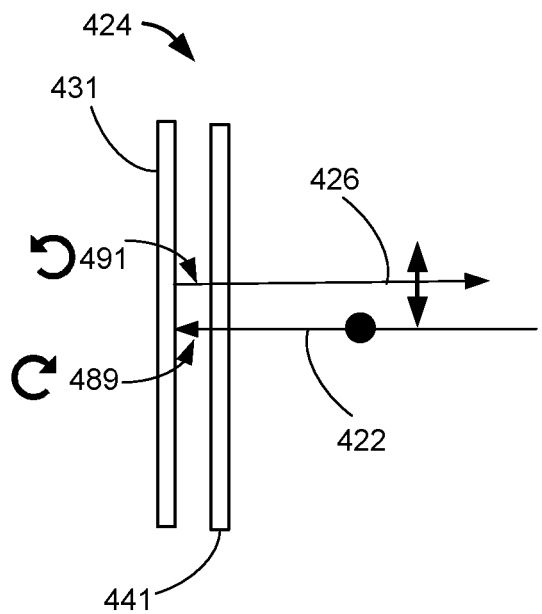
FIG. 4C is a schematic diagram illustrating a polarization rotating redirector in accordance with some embodiments.
Figure 4D:
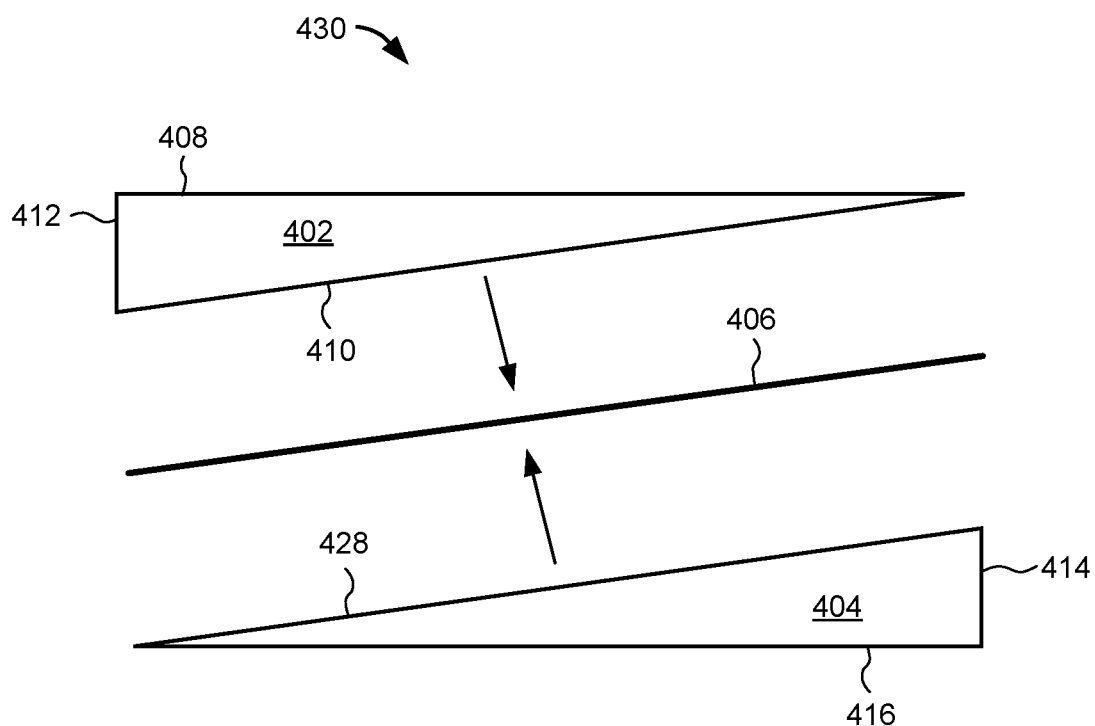
FIG. 4D is an exploded view of the wedge light guide shown in FIG. 4A.

The optical assembly 430 also includes a polarization selective redirector 406 disposed between the first optical component 402 and the second optical component 404 (as shown in FIG. 4D). Referring back to FIG. 4A, the polarization selective redirector 406 transmits rays of a first polarization (e.g., vertically polarized) and redirects (e.g., reflects or diffracts) rays of a second polarization (e.g., horizontally polarized) distinct from (e.g., orthogonal to) the first polarization. For example, the polarization selective redirector 406 may be a polarization selective reflector, such as a wire-grid reflector.

In some embodiments, the optical assembly 430 is coupled with a projector 418, as shown in FIG. 4A. The projector 418 emits a first ray 422 that is imaged (e.g., projected) by an optic 420 and subsequently enters the optical assembly 430 through a first end 432 of the optical assembly 430.

In some embodiments, the first end 432 of the optical assembly 430 includes the third optical surface 414 of the second component 404 and the ray 422 enters the optical assembly 430 through the third optical surface 414 of the second component 404. The ray 422 alternatingly reflects off between the first optical surface 408 of the first optical component 402 and the first optical surface 416 of the second optical component 404. For example, the ray 422 has a first polarization (e.g., vertically polarized) and passes through the polarization selective redirector 406 toward the first optical surface 408 of the first optical component 402. Subsequently, the ray 422 impinges on the first optical surface 408 at an incident angle that is greater than a critical angle associated with the first optical component (e.g., a critical angle for a material of the first optical component and a surrounding medium, such as air). The ray 422 is reflected by the first optical surface 408 of the first optical component 402 by total internal reflection, without changes to its polarization, and passes through the polarization selective redirector 406 toward the first surface 416 of the second optical component 404. The ray reflecting off the first optical surface 408 of the first optical component 402 and passing through the polarization selective redirector 406 impinges on the first optical surface 416 of the second optical component 404 and is reflected off the first optical surface 416 of the second optical component 404 by total internal reflection toward the first optical surface 408 of the first optical component 402.

The ray 422 propagates within the optical assembly 430 generally along a length of the optical assembly 430 (e.g., generally along the –y direction by bouncing between the first optical surface 408 of the first optical component 402 and the first optical surface 416 of the second optical component 404) until the ray 422 impinges on a second end 434 of the optical assembly 430. In some embodiments, the second end 434 of the optical assembly 430 includes the third optical surface 412 of the first component 402.

FIG. 4B illustrates a return path of the ray 422 after the ray 422 is redirected (e.g., reflected) as a ray 426 by a first polarization rotating redirector 424. In some embodiments, as shown in FIG. 4B, the optical assembly 430 is optically coupled with the first polarization rotating redirector 424.

In some embodiments, as shown in FIG. 4C, the first polarization rotating redirector 424 includes a mirror 431 (e.g., a retroreflector), and a phase retarder 441 (e.g., a polarization retarder, a waveplate, a quarter waveplate, etc.). In some embodiments, the phase retarder 441 is a quarter waveplate configured to convert the linearly polarized light 422 to circularly polarized light 489 (e.g., left-circularly polarized light) and transmits the circularly polarized light toward the mirror 431. In general, phase retarders can include different types of waveplates, but hereinafter, the phase retarder is referred to as quarter waveplate 441 as an example. In some configurations, the quarter waveplate 441 has its fast axis oriented such that a first portion of the vertically polarized light accumulates a phase shift of 90° with respect to a second portion of the vertically polarized light, creating the circularly polarized light.

The mirror 431 reflects the circularly polarized light 489 back toward the phase retarder 441 as light 491. When the circularly polarized light 489 is reflected by the mirror 431, the circularly polarized light 491 transmitted toward the phase retarder 441 has a polarization state (e.g., right-circularly polarized light) orthogonal to a polarization state of the circularly polarized light 489 (e.g., left-circularly polarized light). As the circularly polarized light 491 passes through the phase retarder 441, the phase retarder 441 converts the circularly polarized light 491 to linearly polarized light 426 and transmit the linearly polarized light 426 toward the polarization selective redirector 406. In some embodiments, a plane of vibration of the linearly polarized light 422 (e.g., horizontally polarized) is perpendicular to a plane of vibration of the linearly polarized light 426 (e.g., vertically polarized) such that the polarization selective redirector 406 reflects the light 426 toward the first optical surface 408 of the first optical component 402.

Referring back to FIG. 4B, the polarization selective redirector 406 extends between the first end 432 and the second end 434 of the optical assembly 430. A distance along the z direction between the polarization selective redirector 406 and the first optical surface 408 of the first optical component 402 varies as a function of a distance along the y-direction.

The rays redirected (e.g., reflected) by the first polarization rotating redirector 424 alternatingly reflect off the first optical surface 408 of the first optical component 402 and the polarization selective redirector 406. The reflected ray 426 travels increasingly shorter distances along the z-direction upon each reflection off the first optical surface 408 and the first polarization selective redirector 406. Because the polarization selective redirector 406 is oriented at an angle (e.g., not parallel) to the first optical surface 408 of the first optical component 402, the reflected ray 426 impinges alternatingly on the first optical surface 408 and the polarization rotating redirector 406 at incident angles that are progressively smaller. At a location 440 on the first optical surface 408, the reflected ray 426 has an incident angle that is smaller than the critical angle associated with the first optical component. As a result, the reflected ray 426 emerges into the air by leaving the first optical component 402 at the location 440.

Described differently, rays entering the optical assembly 430 through the first end 432 are first guided within a slab (defined by a combination of the first optical component 402 and the second optical component 404). After being redirected (e.g., reflected) by the first polarization rotating redirector 424 placed at the second end 434, the reflected rays are guided within a wedge (e.g., only the first optical component 402) prior to exiting from the wedge and being directed to the viewer or a viewing optics.

The first polarization rotating redirector 424 facilitates the reflected rays to propagate within the wedge (instead of the slab), in part by changing a polarization state of the rays to a polarization state orthogonal to that of the rays 422, so that the reflected rays 426 are reflected by the polarization selective redirector 406.

In some embodiments, the second surface 410 of the first optical component 402 is flat and the polarization selective redirector 406 is flat and in contact with the second optical surface 410 of the first optical component 402. In some embodiments, the second optical surface 428 of the second optical component 404 is also flat, and the polarization selective redirector 406 is also in contact with the second optical surface 428 of the second optical component 404.

Figure 5A:
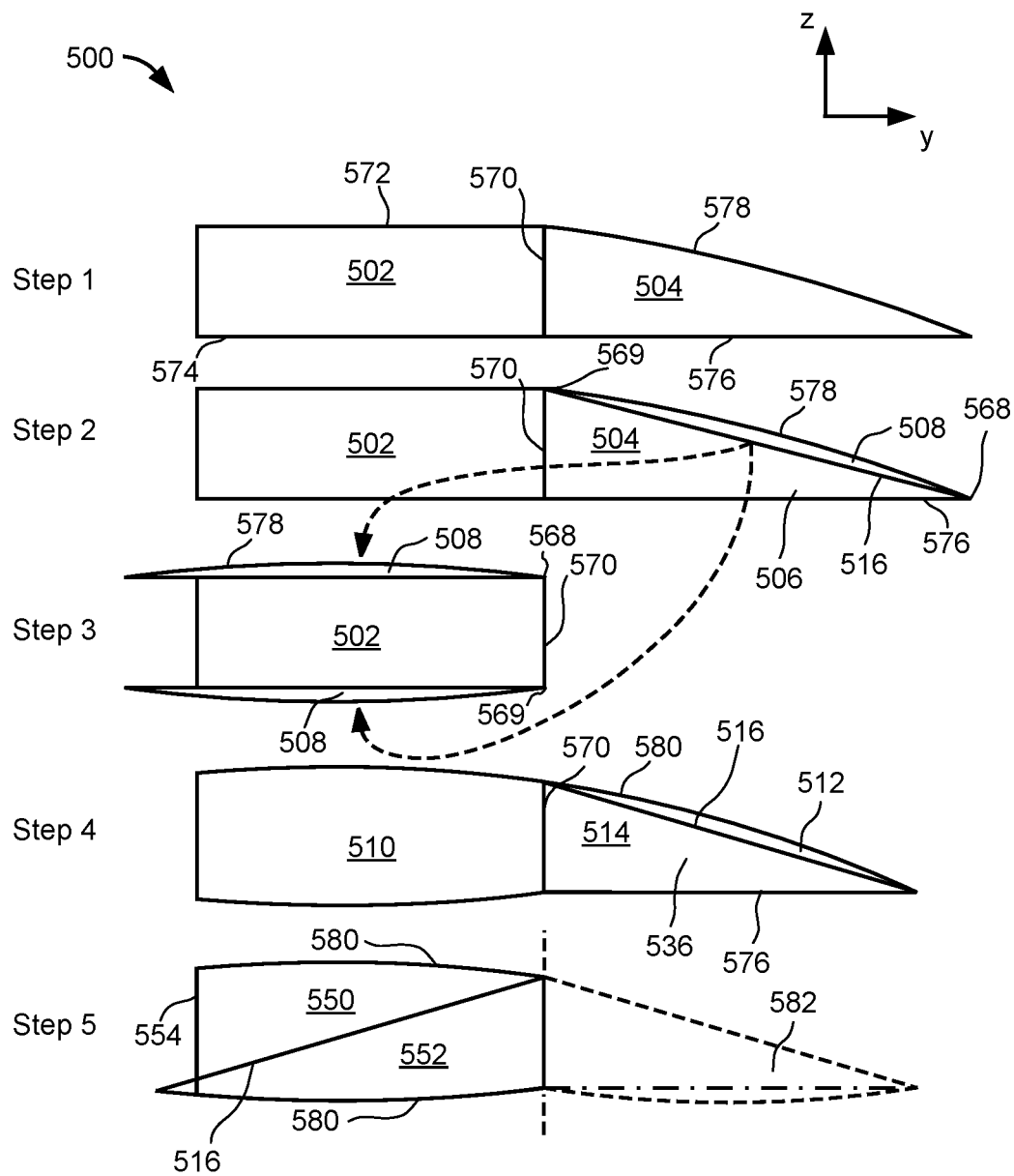
FIG. 5A is a schematic diagram illustrating a method of determining a structure of a wedge light guide in accordance with some embodiments.

FIG. 5A illustrates a method 500 of determining a structure (e.g., a shape) of the optical assembly in accordance with some embodiments.

The method 500 for determining the structure of the optical assembly includes defining a flat slab 502 having a top surface 572 and a bottom surface 574 that are parallel. At step 1, a wedge 504 having a flat bottom surface 576 (e.g., coplanar with the bottom surface 574 of the flat slab 502) abuts the flat slab 502 so that the wedge 504 and the flat slab 502 share a common side surface 570. An upper surface profile 578 of the wedge 504 is selected to allow rays entering the flat slab 502 and reflecting off the top surface 572 and the bottom surface 574 alternatingly to exit the wedge 504 after making a substantially same number of reflections within the flat slab 502 and the wedge 504.

As shown in FIG. 5A, the top surface profile 578 of the wedge 504 may be curved. To generate an updated slab 510, a triangular prism 506 that inscribes the wedge 504 is subtracted from the wedge 504 at step 2, leaving a bulge 508. The triangular prism 506 has the flat bottom surface 576 and the common side surface 570. However, the triangular prism 506 has a flat hypotenuse face 516 that also defines the bottom surface of the bulge 508. The top surface of the bulge 508 corresponds to the top surface 578 of the wedge 504. The bulge 508 also has an edge 568 located away from the side surface 570.

At step 3, the flat slab 502 is updated by joining the bulge 508 to form an updated slab 510. For example, the bulge 508 is added to both the top surface 572 and the bottom surface 574 of the flat slab 502. The bottom surface of a first copy of the bulge 508 is brought into contact with the top surface 572 of the flat slab 502, and the bottom surface of a second copy of the bulge 508 is brought into contact with the bottom surface 574 of the flat slab 502, as shown in step 3 of FIG. 5A. The edge 568 of the top copy of the bulge 508 is brought into contact with the side surface 570. An opposite edge 569 of the bottom copy of the budge 508 is brought into contact with the side surface 570.

As a result, the top and bottom surfaces of the updated slab 510 have a profile corresponding to the top surface profile 578 of the bulge 508. The updated slab 510 no longer has the flat parallel top and bottom surfaces in the flat slab 502. As a result, the rays entering the updated slab 510 over the same range of angles as those entering the flat slab 502 (e.g., incoming rays shown in FIG. 4A) have different incident angles at the top and bottom surfaces of the updated slab 510, and a new surface profile 580 is calculated for an updated wedge 514 at step 4 such that rays entering the updated slab 510 and impinging on the top and bottom surfaces of the updated slab 510 exit the updated wedge after making a substantially same (e.g., equal) number of reflections within the updated slab 510 and the updated wedge 514.

A new bulge 512 is determined from the updated wedge by subtracting a volume of a triangular prism 536 that inscribes the updated wedge to leave an updated bulge 512. When the updated bulge 512 is not substantially similar to the bulge 508 (e.g., the root-mean-square deviation between the surface profiles of the updated bulge 512 and the bulge 508 over the entire top surface is more than 5%, 4%, 3%, 2%, 1%, or 0.5%), the updated bulge 512 is added to the flat slab 502 to obtain a new updated slab, and step 4 is repeated until the updated bulge is substantially similar to the previous bulge.

When the updated bulge (e.g., the bulge 512) is substantially similar to the previous bulge (e.g., the bulge 508) (e.g., the root-mean-square deviation between the surface profiles of the updated bulge and the previous bulge over the entire top surface is within 5%, 4%, 3%, 2%, 1%, or 0.5%), the bulge 512 is moved to the bottom of the updated wedge to form a modified wedge 582, and the modified wedge 582 is "folded" into the slab by rotating the wedge 180° about z direction so that the top surface 516 of the triangular prism 536 is embedded within the updated slab. After the modified wedge 582 is "folded" into the updated slab, the updated slab and the modified wedge continue to share the same surface 570. An angle between the surface 516 and the surface 570 remains constant after the modified wedge is "folded" into the updated slab 510.

In practice, fabricating the updated slab 510 with the folded wedge includes dividing the slab 510 into a first optical component 550 and a second optical component 552 and introducing a polarization selective redirector between the two optical components. In some embodiments, dividing the updated slab 510 into first and second optical components includes calculating dimensions of the first optical component 550 and dimensions of the second optical component 552 based on the location where the top surface 516 is embedded in the updated slab 510. The first optical component 550 and the second optical component 552 are manufactured according to the respective calculated dimensions.

The wedge shaped first optical component 550 has a first surface (e.g., top surface) that is curved, a second flat surface 554 that is flat, and a third surface 516 that is also flat. The first surface, the second surface 554, and the third surface 516 are all not parallel to one another.

A flat polarization selective redirector (e.g., a polarization selective redirector similar to the polarization selective redirector 406) is positioned on the top surface 516. Each of the first optical component 550 and the second optical component 552 includes a flat optical surface that is in contact with the flat polarization selective redirector (in a manner analogous to that shown in FIG. 4D). In some embodiments, the polarization selective redirector has a non-planar shape, and as a result, the first optical component and the second optical component may have an extra degree of freedom relative to the devices described in FIGS. 5-8.

As explained above, each of the first and second optical components 550 and 552 includes a curved optical surface that corresponds to at least a portion of the surface profile 580 of the updated wedge 514. A length of the flat surface 516 of the updated wedge 514 may extend beyond the length of the updated slab. Thus, the flat polarization selective redirector may not meet the updated slab at the intersection of a second surface 554 and the bottom surface of the updated slab 510.

Figure 5B:
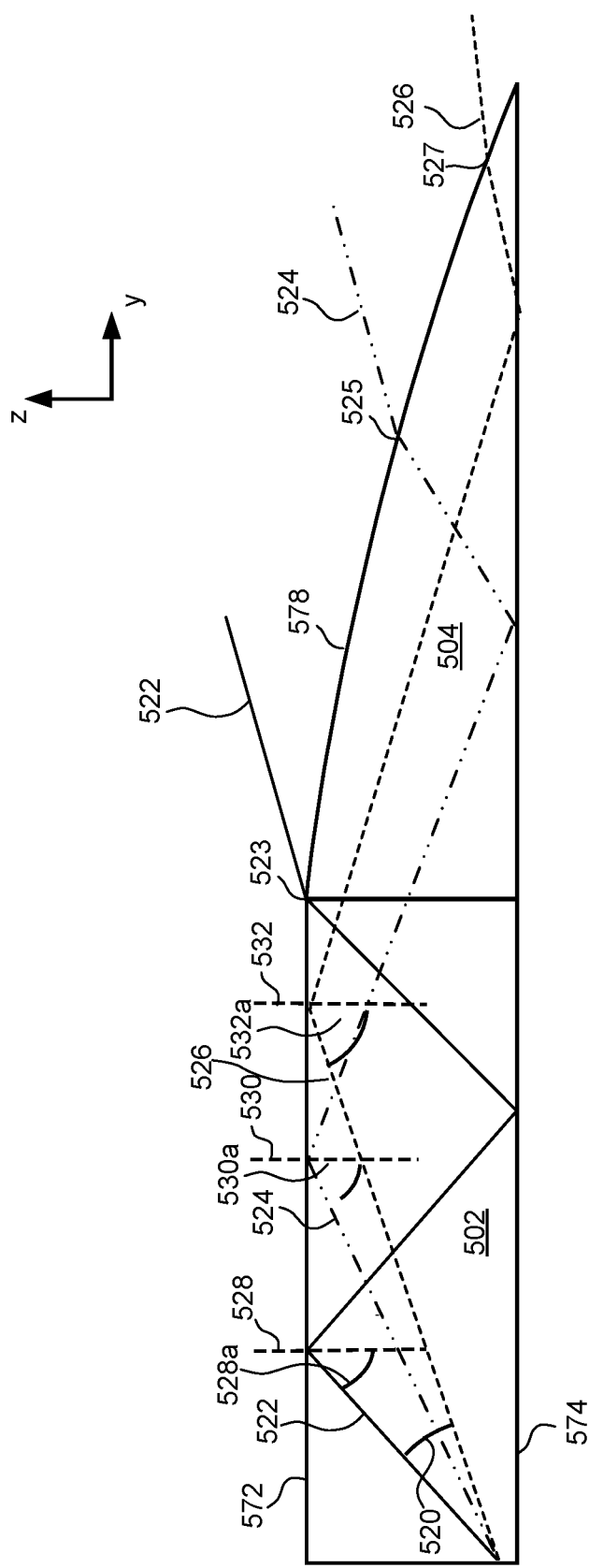
FIG. 5B is a schematic diagram illustrating paths of different rays within a wedge light guide in accordance with some embodiments.

FIG. 5B is a schematic diagram illustrating paths of different rays within a wedge light guide in accordance with some embodiments. The (first) wedge 504 has a top surface 578 that is determined based on the flat slab 502 having parallel top surface 572 and bottom surface 574. Ray 522, ray 524, and ray 526 span an angular range 520 and are directed to the top surface 572 of the slab 502 as shown. The rays 524, 526 and 528 serve as pilot rays. The surface normal 528, 530, and 532 are parallel to one another.

To determine the profile of the surface 578, the ray 522 is launched at the critical angle inside the slab 510 so that an incident angle 528a made by the ray 522 upon its first reflection off the top surface 578 is thus equal to the critical angle. In the example illustrated in FIG. 5B, the ray 522 undergoes two reflections and exits a combination of the slab 502 and the wedge 504 at a position 523 where the slab 502 and the wedge 504 adjoins. A ray 524 makes an incident angle 530a, with respect to the surface normal 530, which is larger than the angle 528a, upon its first reflection off the top surface 578. In order to have the ray 524 exit the combination of the slab 502 and the wedge 504 after two reflections (like the ray 522), a surface 578 is selected to have a particular curvature (or slope) at a position 525 where the ray 524 impinges on the surface 578 so that the particular curvature (or slope) at the position 525 allows the ray 524 to exit the wedge 504. In some configurations, the ray 524 after exiting the wedge 504 propagates in a direction substantially parallel to the ray 522 that is output from the wedge 504. To "fill in" the profile of the surface 578 between the position 523 and the position 525, additional pilot rays, having incident angles between 528a and 530a, may be used. The ray 526 makes an incident angle 532a, with respect to the surface normal 532, which is larger than the incident angle 530a, upon its first reflection off the top surface 578. In order to have the ray 526 exit the combination of the slab 502 and the wedge 504 after two reflections (e.g., like the rays 522 and 524), the surface 578 is selected to have a particular curvature (or slope) at a position 527 where the ray 526 impinges on the surface 578 so that the particular curvature (or slope) at the position 527 allow the ray 526 to exit the wedge 504. In some configurations, the ray 526 after exiting the wedge 504 propagates in a direction substantially parallel to the direction of the ray 522 and the ray 524 after exiting the wedge 504. To "fill in" the profile of the surface 578 between the position 525 and the position 527, additional pilot rays, having incident angles between 530*a* and 532*a*, may be used. As shown in FIG. 5B, surface normal for different locations across the surface 578 along the y direction are not parallel to one another.

A similar procedure may be used to find the wedge profile 580 shown in FIG. 5A.

Figure 6A:
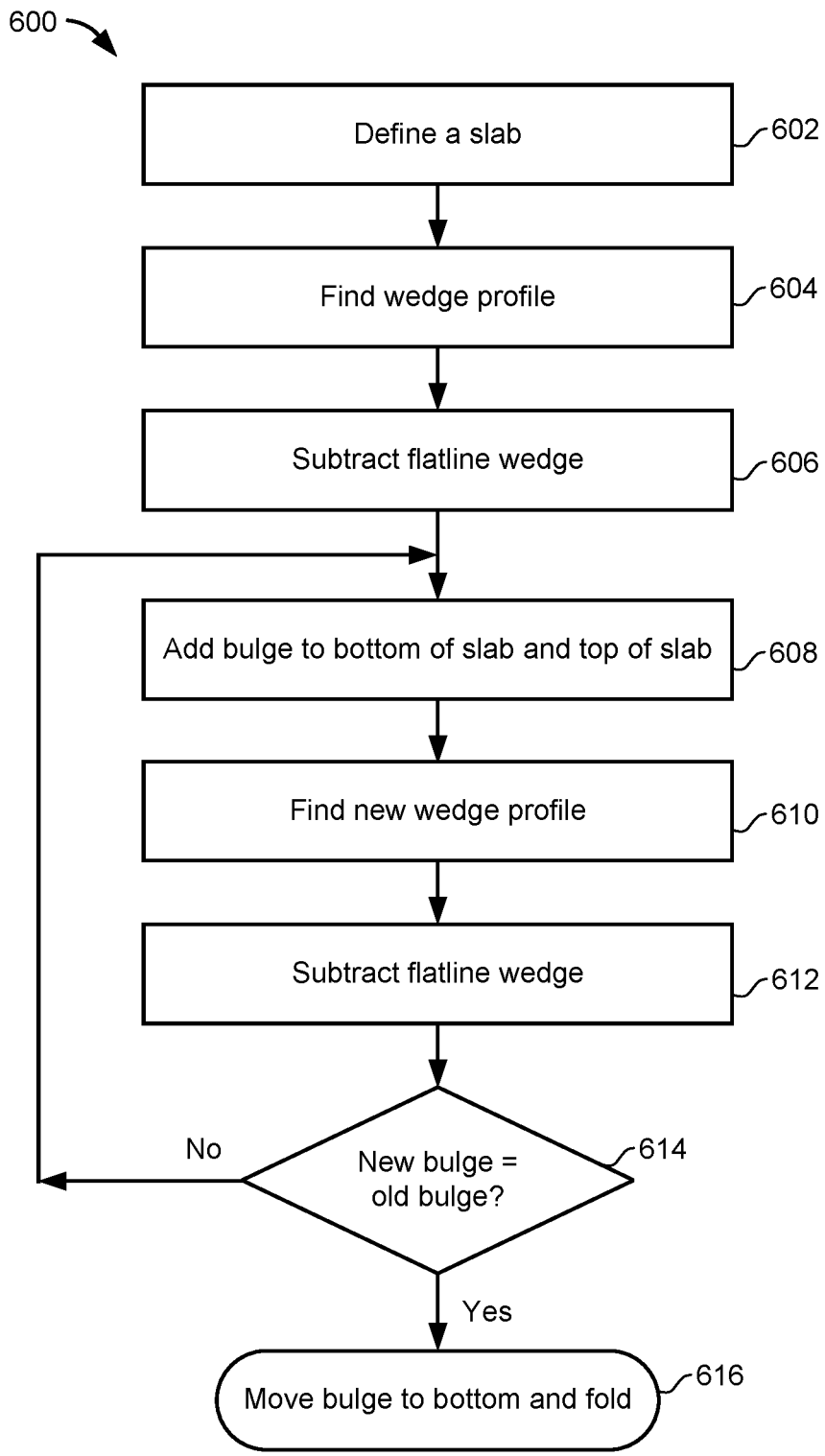
FIG. 6A is a flow chart illustrating a method of determining a structure of a wedge light guide in accordance with some embodiments.

FIG. 6A shows a flow chart illustrating a method 600 for determining a structure (or a shape) of a wedge light guide (e.g., optical assembly 430) in accordance with some embodiments. In some embodiments, the method 600 is performed by one or more processors (e.g., processors of an electronic device, such as a microprocessor). At step 602, the processor is used to define a slab (e.g., slab 502). In some embodiments, the slab has flat top and bottom surfaces. Based on the defined slab, the processor calculates, at step 604, a surface profile of a wedge abutting the slab (e.g., wedge 504). The surface profile of the wedge is chosen so that rays entering the slab over a range of angles exit the slab and the wedge after an equal number of reflections. At step 606, the processor determines a triangular prism (e.g., triangular prism 506) that inscribes the wedge having the surface profile calculated at step 604 and subtracts the triangular prism from the wedge (e.g., step 2 in FIG. 5A). The remaining structure after the subtraction is referred to herein as a bulge (e.g., the bulge 508). The bulge has a flat bottom surface (defined by the flat hypotenuse face of the triangular prism) and the top surface profile calculated at step 604.

At step 608, the processor joins a copy of the bulge obtained from step 606 to each of the top and bottom flat surfaces of the slab defined at step 602, as shown in step 3 of FIG. 5A. The bulge is joined so that the flat surface of the bulge abuts the flat top (and bottom) surface of the slab.

At step 610, the processor calculates a new wedge surface profile based on the updated slab formed in the step 608. The new surface profile of the wedge is calculated to allow the rays impinging on surfaces of the slab over a range of angles to exit the slab with the bulges (from the step 608) and the new wedge (from the step 610) after an equal number of reflections. At step 612, the processor determines a new triangular prism that inscribes the new wedge having the surface profile calculated at step 610 and subtracts the new triangular prism from the new wedge profile determined at step 610 (e.g., step 4 in FIG. 5A). The remaining structure after the subtraction operation of step 612 is a new bulge (e.g., the bulge 512), having a flat bottom surface (defined by the flat hypotenuse face of the new triangular prism) and the surface profile calculated at step 610.

At step 614, the processor determines whether the bulge obtained at step 612 is substantially similar to the bulge obtained at step 606. In some embodiments, the bulges are substantially similar if their volumes deviate by less than 5% from each other. In some embodiments, the bulges are substantially similar if the root-mean-square deviation between their surface profiles over the entire bulge is less than 5%, 4%, 3%, 2%, 1%, or 0.5%. In some embodiments, the bulges deemed to be substantially similar when lengths of the wedges (or the bulges) differ by less than 5%, 4%, 3%, 2%, 1%, or 0.5%.

In accordance with a determination at step 614 that the new bulge is not substantially similar to the old bulge, the processor repeats the steps 608 through 612. When repeating the step 608, the new bulge obtained from the previous iteration of the step 610 is added to the top and bottom surfaces of the flat slab at step 608 before the processor calculates a new wedge profile at step 610.

In accordance with a determination at step 614 that the new bulge is substantially similar to the new bulge, the processor at step 616 removes the new bulge from the top of the wedge profile (e.g., leaving a flat hypotenuse face) to the bottom of the wedge and folds the wedge profile toward the slab by adding the flat hypotenuse face (e.g., 516) to the slab (as shown in step 5 of FIG. 5A). Prior to folding, the slab and the wedge share a common side surface (e.g., 570). After the wedge is "folded" into the updated slab, the slab and the wedge continue to share the same surface (e.g., surface 570). An angle between the flat surface of the wedge (e.g., flat hypotenuse face 516) and the shared surface (e.g., surface 570) remains constant after the processor "folds" the wedge into the slab.

Figure 6B:
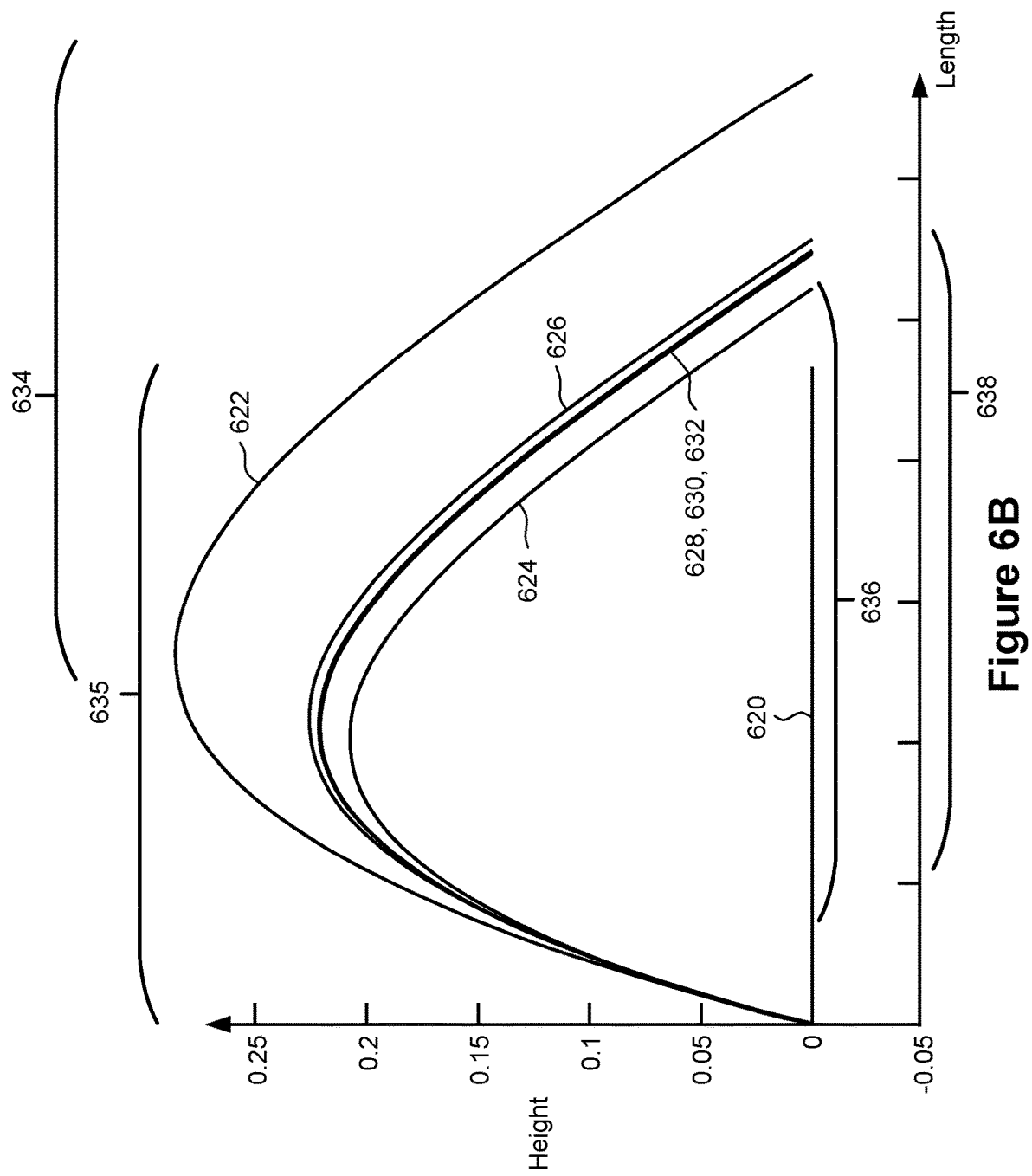
FIG. 6B shows surface profiles of a wedge light guide through iterations of the operations shown in FIG. 6A.

FIG. 6B shows surface profiles of the slab over multiple iterations of the steps of the method 600 shown in FIG. 6A. In FIG. 6B, a line 620 represents an initially flat top surface of the slab that is defined in the step 602 of the method 600.

A curve 622 shows the surface profile of the bulge determined after a step 606 described with respect to FIG. 6A. A first portion 634 of the curve 622 is added to the initially flat top surface (and a second portion 635 of the curve 622 is added to the initially flat bottom surface) of the slab so that the updated slab has a top surface profile corresponding to the first portion 634 of the curve 622 (and the updated slab has a bottom surface profile corresponding to the second portion 635 of the curve 622). For the updated slab having a top surface profile corresponding to the first portion 634 of the curve 622 (and a bottom surface profile corresponding to the second portion 635 of the curve 622), a new surface profile of the wedge is calculated (at step 610 shown in FIG. 6A).

A curve 624 shows the surface profile of the bulge after a first iteration of step 610. Because the curve 624 is not substantially similar to the curve 622, a portion 636 of the curve 624 is added to the initially flat top surface of the slab (and a portion 635 of the curve 624 is added to the initially flat bottom surface of the slab), forming a second updated slab. For the second updated slab having a top surface profile corresponding to the portion 636 of the curve 624 (and a bottom surface profile corresponding to the portion 635 of the curve 624), a new surface profile of the wedge is calculated (at a second iteration of step 610).

A curve 626 shows the surface profile of the bulge after the second iteration of step 610, and curves 628, 630, 632 show the surface profiles of the bulge after third, fourth, and fifth iterations of step 610, respectively. Depending on the selection criteria, one of the curves 628, 630, and 632 is selected, and the portion 638 of the selected curve is used as a surface profile of the top surface of the slab and the portion 635 of the selected curve is used as a surface profile of the bottom surface of the slab.

When the hypotenuse face 516 is flat, the slab may be shorter than the wedge, as shown in FIG. 5A. As a result, a head-mounted display that incorporates such a light guide (e.g., an optical assembly) may have its light source (e.g., a projector) placed off to one side of the optical assembly to account for the difference in length between the slab and the wedge.

Figure 7:
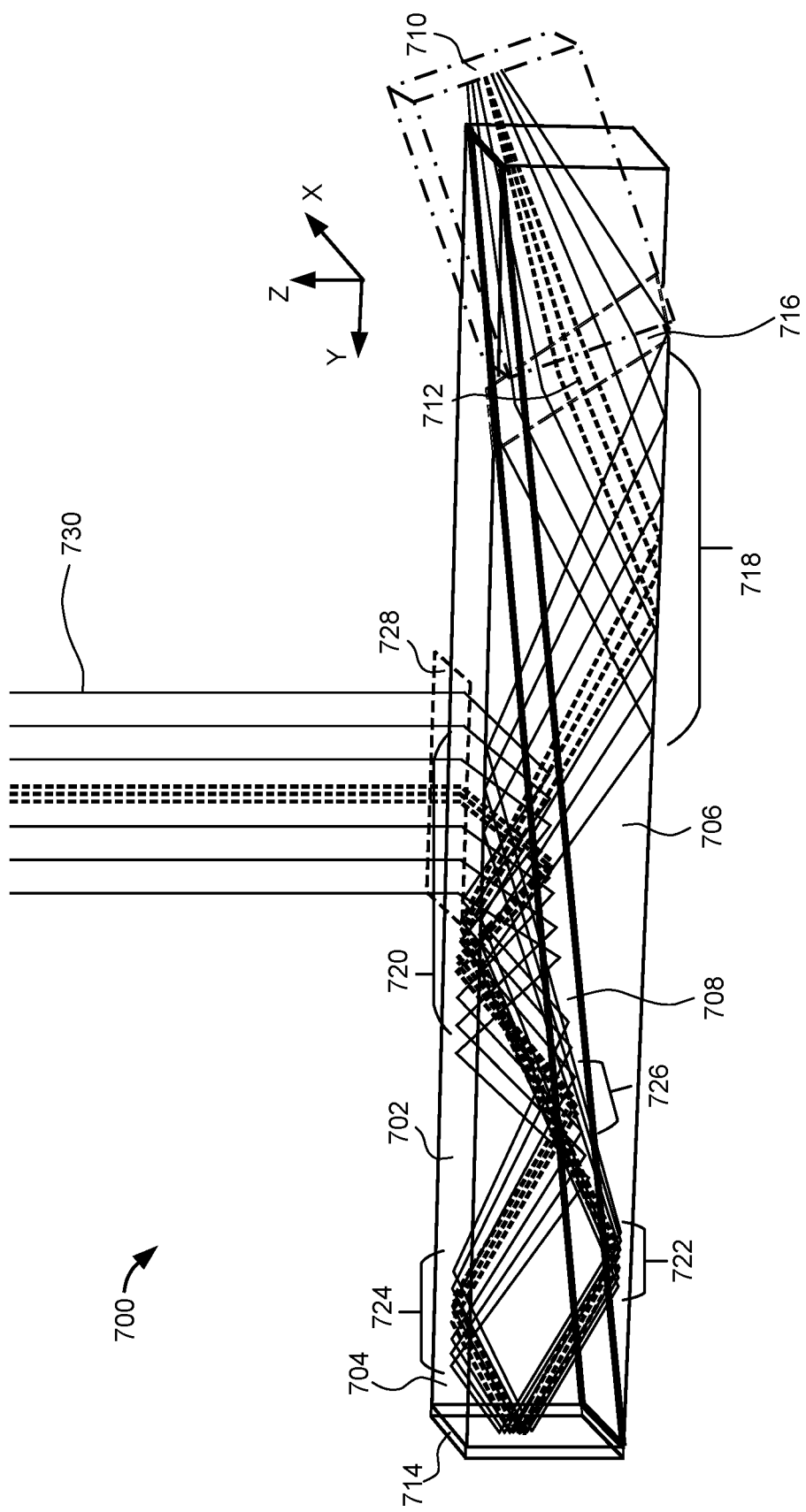
FIG. 7 is a schematic diagram illustrating a light guide in a head-mounted display device in accordance with some embodiments.

FIG. 7 shows an optical device 700 including an optical assembly 702 in accordance with some embodiments. The optical device 700 used in a head-mounted display (e.g., FIG. 3). The optical assembly 702 includes a first optical element 704, a second optical element 706, and a polarization selective redirector 708. The polarization selective redirector 708 (shown by thick lines) is flat and is disposed between the first optical element 704 and the second optical element 706 (in a manner analogous to that shown in FIG. 4D). A light source 710 (e.g., a projector) emits light 712 having a first linear polarization. Central rays of the light 712 are illustrated with dashed lines. The polarization selective redirector 708 is configured to transmit impinging light having the first linear polarization. The optical assembly 702 functions like a slab for the light 712 having the first linear polarization.

A polarization rotating redirector 714 redirects (e.g., reflects or diffracts) the light 712 and changes its polarization into a second linear polarization state, orthogonal to the first polarization state. As a result, the reflected light 712 is only guided within the first optical component 702: the polarization selective redirector 708 redirects (e.g., reflects or diffracts) the light 712 having the second linear polarization. Thus, in some cases, the light 712 no longer enters the second optical element 706 after redirection by the polarization rotating redirector 714. As a result, the light 712 traverses the wedge portion of the optical assembly 702, the wedge portion formed by the first optical component 702.

To account for the difference in length between the shorter slab portion and the longer wedge portion, the optical assembly 702 includes an entry port 716. The entry port 716 is shown as the plane enclosed by double long-dash-short-dash lines. In some embodiments, a portion of an optical assembly having a shape of a rectangular prism is removed to provide the entry port 716 (e.g., the optical assembly having a shape of a rectangular prism is truncated to provide the entry port 716 that defines a slanted facet of the optical assembly 702). For example, the optical assembly having a shape of a rectangular prism is modified to have a shape of a trapezoidal prism. In some embodiments, the first optical component 704, the second optical component 706, and the polarization selective redirector 708 have respective shapes so that, once assembled, the optical assembly 702 has a shape other than a rectangular prism (e.g., a trapezoidal prism with the slanted entry port 716).

In FIG. 7, the light source 710 is shown schematically as a rectangular cuboid marked by dot-dash lines for ease of visually locating the rays 712, before the rays 712 enter the optical assembly 702 through the entry port 716. In some embodiments, the light source 710 is a projector and the rectangular cuboid includes optics for projecting the light from the projector to the entry port 716.

After entering the optical assembly 702 through the entry port 716, the light 712 undergoes a first reflection in a region 718 on the bottom surface of the second optical component 706. Although the bottom surface of the second optical component 706 is illustrated as being flat, the bottom surface of the second optical component 706 may have a curvature (e.g., in the z-direction), similar to the bottom surface of the slab 510 shown in FIG. 5A.

After reflecting off the bottom surface of the second optical component 706 in the region 718, the light 712 is transmitted through the polarization selective redirector 708, and reflects off a region 720 in a top surface of the first optical component 704. Although the top surface of the first optical component 704 is illustrated as being flat, the top surface of the first optical component 704 may have a curvature (e.g., in the z-direction), similar to the top surface of the slab 510 shown in FIG. 5A.

The light 712, after reflecting off the top surface of the first optical component 704, is transmitted through the polarization selective redirector 708, and reflects off a region 722 of the bottom surface of the second optical component 706. Thereafter, the light 712 is transmitted through the polarization selective redirector 708 toward the polarization rotating redirector 714.

The polarization rotating redirector 714 redirects (e.g., reflects or diffracts) the light 712 while rotating the first linear polarization of the light 712 into a second linear polarization, orthogonal to the first linear polarization. The reflected light 712 reflects off a region 724 of the top surface of the first optical component 704, toward a region 726 of the polarization selective redirector 708.

As the reflected light 712 has the second linear polarization orthogonal to the first linear polarization, the polarization selective redirector 708 redirects (e.g., reflects or diffracts) the reflected light 712 toward the top surface of the first optical component 704, instead of transmitting the reflected light 712 toward the bottom surface of the second optical component 706. The reflected light 712 undergoes another reflection adjacent the region 720 of the top surface of the first optical component 704, and another reflection off the polarization selective redirector 708 before exiting the optical assembly 702.

An optical element 728 (e.g., a volume hologram) is positioned to redirect the light 712 so that the redirected light 712 exits the first optical component 704. In some embodiments, the optical element 728 deflects the light 712 in a direction that is normal to a plane substantially parallel to the top surface of the first optical component 704. In some embodiments, the optical element 728 has a focal power. The focal power may be selected to collimate the rays output from the first optical component 704 as collimated light 730.

Even though the dashed lines, including a chief ray, are shown as exiting the first optical component 704 almost half-way between the entry part 716 and the polarization rotating redirector 714, the polarization selective redirector 708 extending all the way to the entry port 716 up to the edge 732) may be used for rays emitting from the projector 710 at other angles (e.g., marginal rays).

In some embodiments, the image from a laser beam projector is coupled into the entry port via a relay lens.

In some embodiments, the polarization selective redirector 708 includes (or is) a wire-grid polarizer.

For an optical device with a slim optical component, such as the optical assembly 702 shown in FIG. 7, the thickness of the optical assembly 702 may have an impact on the performance of the optical device. In some cases, a performance of an optical system is characterized using its etendue. Etendue is the product of an optical system's pupil area and field of view (or a surface integral of the field of view over the pupil area).

As described above, a light guide is a slim optics that allows light from the light emitter to be expanded, and a thickness of the light guide can limit the etendue of the light guide, which in turn limits the field of view or the eyebox covered by the light guide.

Figure 8:
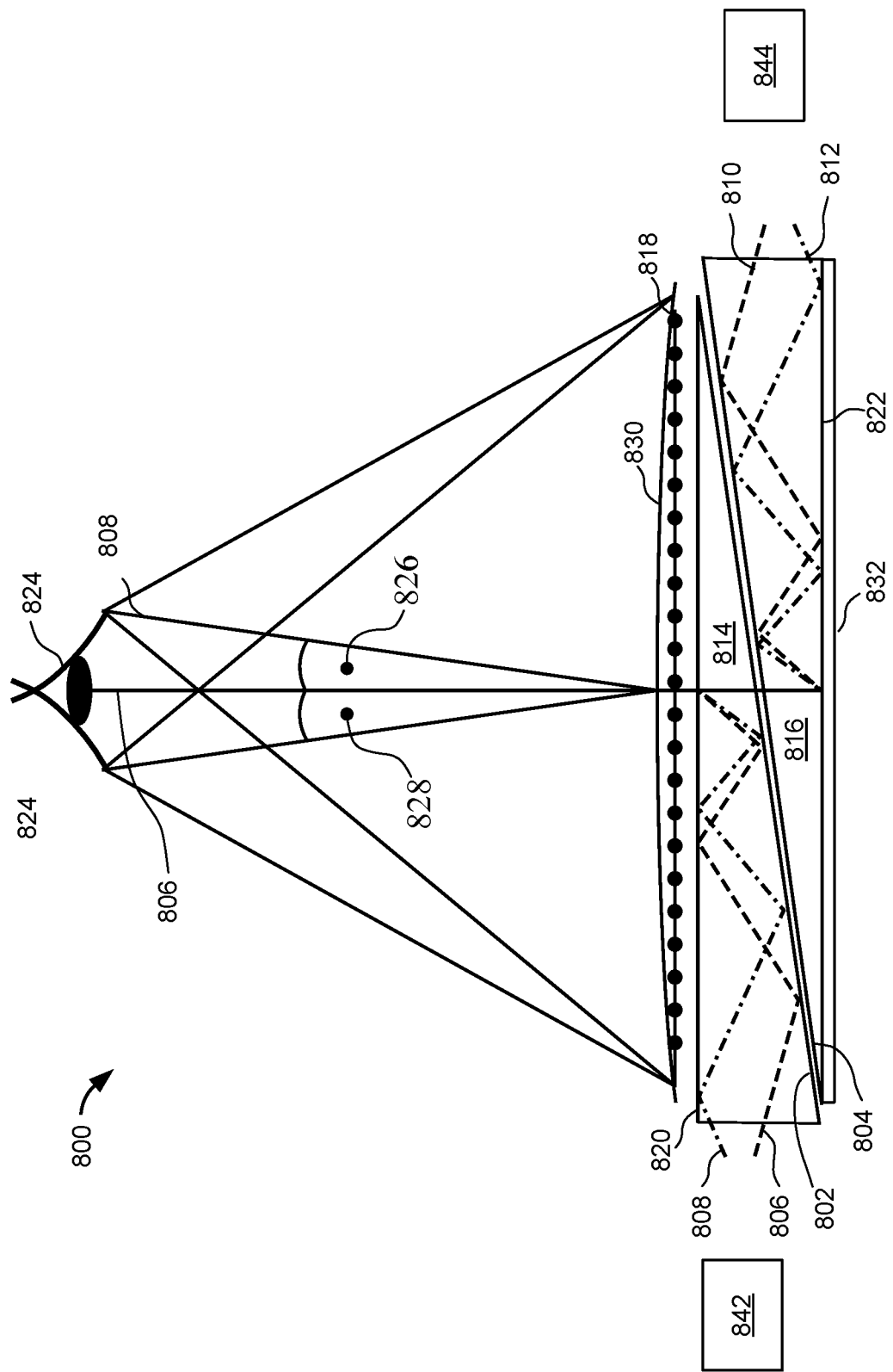
FIG. 8 is a schematic diagram illustrating how etendue is increased in accordance with some embodiments.

A configuration, which increases the etendue without increasing the thickness of the light guide is illustrated in FIG. 8.

Figure 12A:
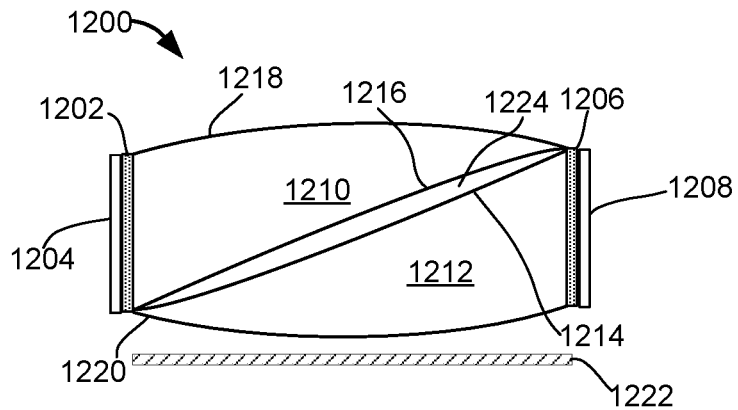
FIG. 12A is a schematic diagram illustrating a light guide using in conjunction with two projectors in accordance with some embodiments.
Figure 12B:
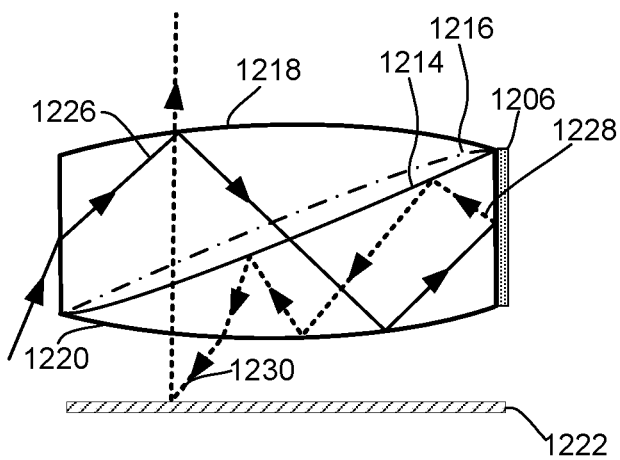
FIG. 12B is a schematic diagram illustrating a path of light emitted from a first projector shown in FIG. 12A.
Figure 12C:
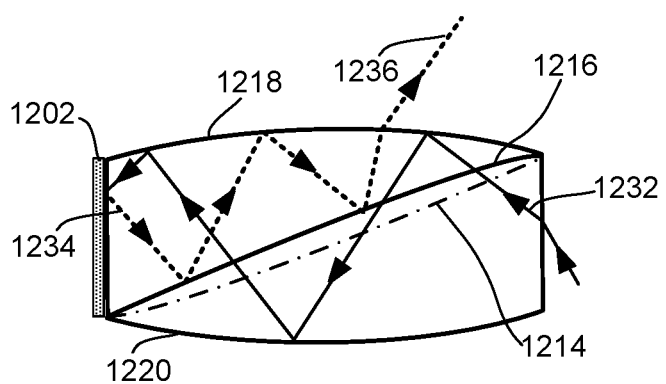
FIG. 12C is a schematic diagram illustrating a path of light emitted from a second projector shown in FIG. 12A.

Shown in FIG. 8 is a system 800 that expands an eye-box of the user while doubling an etendue of the light guide without extra thickness. The system 800 includes a first polarization selective redirector 802 that is in contact with a first wedge optical component 814. The system also includes a second polarization selective redirector 804 that is in contact with a second wedge optical component 816. In FIG. 8, the gap between the first polarization selective redirector 802 and the second polarization selective redirector 804 is exaggerated. In some configurations, there may be no gap when a common polarization selective reflector is used instead of the first polarization selective redirector 802 and the second polarization selective redirector 804. When the first polarization selective redirector 802 and the second polarization selective redirector 804 are curved, as shown in FIGS. 12A-12C, the region between the two polarization selective redirectors may be filled with a material having a same refractive index as the material used to form the first optical component 814 and the second optical component 816.

Ray 808 and ray 806 are emitted from a first projector 842, and both rays 808 and ray 806 have a second linear polarization. The ray 808 and ray 806 have different angles of emission from the first projector 842. Ray 808 reflects off a top surface 820 of the first optical component 814 toward the first polarization selective redirector 802. The first polarization selective redirector 802 redirects the ray 808 back toward the top surface 820 of the first optical component 814. Ray 806 is also redirected (e.g., reflected or diffracted) by the first polarization selective redirector 802 toward the top surface 820 of the first optical component 814 because of the ray 806 has a second linear polarization. As the rays 808 and 806 alternatingly reflect between the top surface 820 of the first optical component 814 and the first polarization selective redirector 802, an incident angle of the rays with a respective reflective surface becomes smaller. When the rays impinge on the top surface 820 at an angle smaller than the critical angle of the first optical component 814, the rays emerge from the first optical component 814. A grating 818 projects (e.g., by diffraction) the rays 808 and 806 toward an eye 824 of a user, sometimes in conjunction with a lens 830. The rays 808 and 806 make an angle 826 in air.

Ray 810 and ray 812 are emitted from a second projector 844, and both rays 810 and ray 812 have a second linear polarization. The ray 810 and ray 812 have different angles of emission from the second projector 844. Ray 812 reflects off a bottom surface 822 of the second optical component 816 toward the second polarization selective redirector 804. The second polarization selective redirector 804 redirects (e.g., reflects or diffracts) the ray 812 back toward the bottom surface 822 of the second optical component 816. Ray 810 is redirected (e.g., reflected or diffracted) by the second polarization selective redirector 804 toward the bottom surface 822 of the second optical component 816 because of the ray 810 has the second linear polarization. As the rays 810 and 812 alternatingly reflect between the bottom surface 822 of the second optical component 816 and the second polarization selective redirector 804, an incident angle of the rays with a respective reflective surface becomes smaller. When the rays impinge on the top surface 820 at an angle smaller than the critical angle of the second optical component 816, the rays emerge from the second optical component 816 and is redirected by a polarization rotating redirector 832 back through the second optical component 816 and the first optical component 814. In some embodiments, the polarization rotating redirector 832 includes a reflector (e.g., a mirror) and a phase retarder (e.g., a quarter waveplate), similar to the structure of the polarization rotating redirector 424 shown in FIG. 4C. A grating 818 diffracts the rays 810 and 812 toward the eye 824 of a user. The rays 810 and 812 make an angle 828 in air.

The total angle in air (corresponding to the field of view) is doubled (from angle 826, which is obtained by using the first optical element 814 without the second optical component 816, to the sum of angle 826 and angle 828, which is obtained by using both the first optical element 814 and the second optical element 816). Doubling the angle in air increases the field of view, thus doubling the etendue. In some embodiments, polarization rotating redirectors, in addition to the first projector 842 and the second projector 842 at respective ends of the light guide, are provided at both ends of the light guide.

FIGS. 9A-12 show optical components in which two surfaces (e.g., the first surface and the third surface) of the wedge are curved. When two such wedge optical components are placed nose-to-tail (e.g., an intersection line of the first surface and the third surface of the first optical component is lined up with an intersection line of the first surface and the second surface of the second optical component), two polarization selective redirectors may be used instead of one (e.g., a flat polarization selective redirector positioned on a flat hypotenuse face 516).

In FIGS. 9A-12, the length of the wedge may equal that of the slab. This allows an image to be launched at each end by a display whose emission is largely parallel or perpendicular to the wires of the polarizing mirror. In some embodiments, such a design may reduce or eliminate the need for projection optics.

Figure 9A:
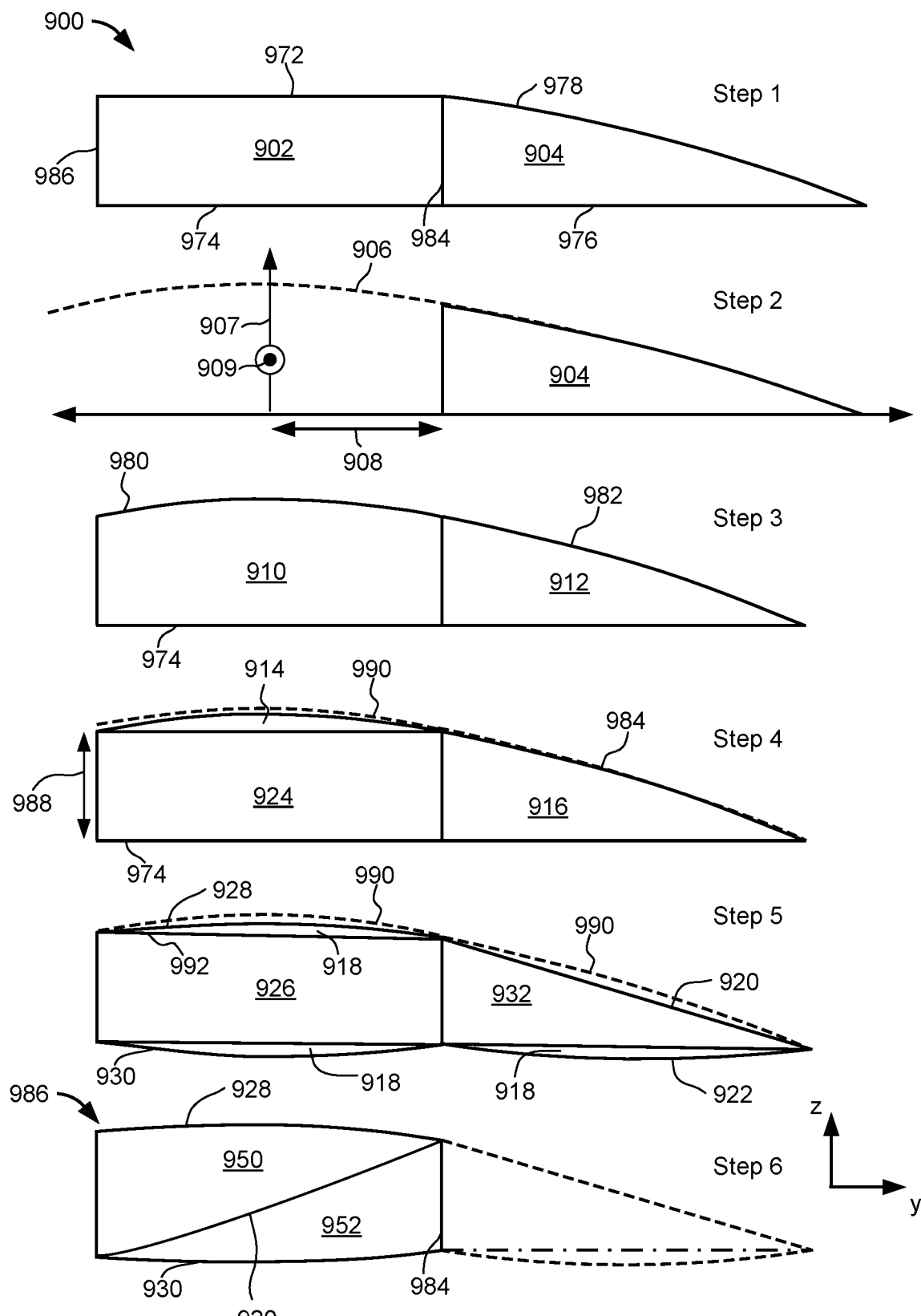
FIG. 9A is a schematic diagram illustrating a method of determining a structure of a wedge light guide in accordance with some embodiments.

FIG. 9A is a schematic diagram illustrating a method 900 of determining a structure of a wedge light guide in accordance with some embodiments, in which two polarization-selective redirectors are included. The method 900 includes defining a flat slab 902 having a top surface 972 and a bottom surface 974 that are parallel at step 1. A wedge 904 having a flat bottom surface 976 (e.g., coplanar with the bottom surface 974 of the flat slab 902) abuts the flat slab 902 along an end surface 984. An upper surface profile 978 of the wedge 904 is selected to allow rays entering the flat slab 902 through an input surface 986 and impinging on the top surface 972 or the bottom surface 974 over a range of angles to exit the wedge 904 after making a substantially same (e.g., equal) number of reflections within the flat slab 902 and the wedge 904.

In some embodiments, the top surface profile 978 of the wedge 904 is curved. An even polynomial curve 906 is fit to the wedge 904 at step 2. An origin (or a line of reflective symmetry) of the even polynomial is placed halfway along the slab, at a distance 908 away from the wedge 904. Placing the origin of the even polynomial at this position allows the guide (or the slab 926 described below) to have 180° rotational symmetry about the slab center 909. The polynomial is extended to the left end of the slab so that it defines anew surface for an updated slab 910. Due to the fitting of the even polynomial, there is no sudden change in slope at the slab 910 and wedge 904 transition. When there is no sudden change in slope at the transition between the slab and wedge, the ends of the guide can be flat. In contrast, when a transition is sudden, for example, between a flat-sided slab and a flat-sided wedge, the mirrored end of the system is curved to accept rays from the wedge in a smoothly varying fashion.

The updated slab 910 no longer has the flat top surface 972 and the flat bottom surface 974. Rather, the updated slab 910 has a top surface 980 that matches the even polynomial 906. The rays entering the updated slab 910 over the same range of angles as those entering the flat slab 902 will have different incident angles at the surface 980.

At step 3, a new surface profile 982 is calculated for an updated wedge 912 such that rays entering the updated slab 910 and impinging on its surface 980 over a range of angles exit the updated wedge 912 after making a substantially same (e.g., equal) number of reflections within the updated slab 910 and the updated wedge 912.

An even polynomial function 990 is used to fit the updated wedge 912 having the top surface 982, in a manner similar to that described with respect to the curve 906. The even polynomial function 990 is extended to yield another updated slab 924.

If the updated slab 924 is not substantially similar to the updated slab 910, the process is repeated by until an updated slab is substantially same as a previous slab.

If the updated slab 924 is substantially similar to the updated slab 910, at step 4, a slab bulge 914 is determined by subtracting a flag slab having a height of the input thickness 988 from the updated slab 924.

At step 5, the slab bulge 914 is halved to form a bulge 918. FIG. 9C shows in greater details how the bulge 914 is halved.

The bulge 918 is subtracted from the (top) surface profile described by the even polynomial 990, resulting in a slab 926 having a top surface 928. Another copy of the bulge 918 is added to the bottom surface 974 such that a flat surface of the bulge 918 is in contact with the flat bottom surface 974, forming a new bottom surface 930. The bulge 918 is also subtracted from the polynomial 990 in a wedge 932, to form a top surface 920 having a concave profile. Another copy of the bulge 918 is added to the bottom surface of the wedge 932 (similar to the procedure made with respect to the slab 926) to form a new bottom surface 922. In some embodiments, the new bottom surface 930 is identical to the new bottom surface 922.

After the modification, the slab 926 now has 180° rotational symmetry (e.g., along the x, y, and z axis) and the wedge can be folded into the slab 926 by inserting a polarization-selective redirector having the surface profile of the top surface 920 into the slab 926. Folding the wedge 932 involves rotating the wedge 932 by 180° about the z axis so that the top surface 920 is embedded within the slab 926. The slab 926 and the wedge 932 continues to share the surface 984. An angle between the top surface 930 and the surface 984 remains substantially constant after the wedge 932 is folded into the slab 926.

In some embodiments, fabricating the slab 926 with the "folded" wedge includes dividing the slab 926 into a first optical component 950 and a second optical component 952 and introducing the polarization selective redirector having the profile of the surface 920 between the two optical components. In some embodiments, dividing the updated slab into first and second optical components includes calculating dimensions of the first optical component 950 and dimensions of the second optical component 952 based on the location where the top surface 930 is embedded in the slab. The first optical component and the second optical component are manufactured according to the calculated dimensions.

In some embodiments, each of the first optical component 950 and the second optical component 952 has a complementary surface profile that is in contact with the polarization selective redirector. In some embodiments, the first optical component 950 has a convex surface that is in contact with (and matches) the concave side of the polarization selective redirector. In some embodiments, the second optical component 952 has a concave surface that is in contact with (and matches) the convex side of the polarization selective redirector. An optical assembly 986 is formed by the first optical component 950 and the second optical component 952 with a polarization selective reflector therebetween.

In some embodiments, the even polynomials 906 and 990 are sixth order polynomials.

In contrast to the first optical component 550 and the second optical component 552, which have a length that is substantially shorter than a length of the surface 516, the first optical component 950 and the second optical component 952 have a substantially same length as a length of the curved surface 920.

Figure 9B:
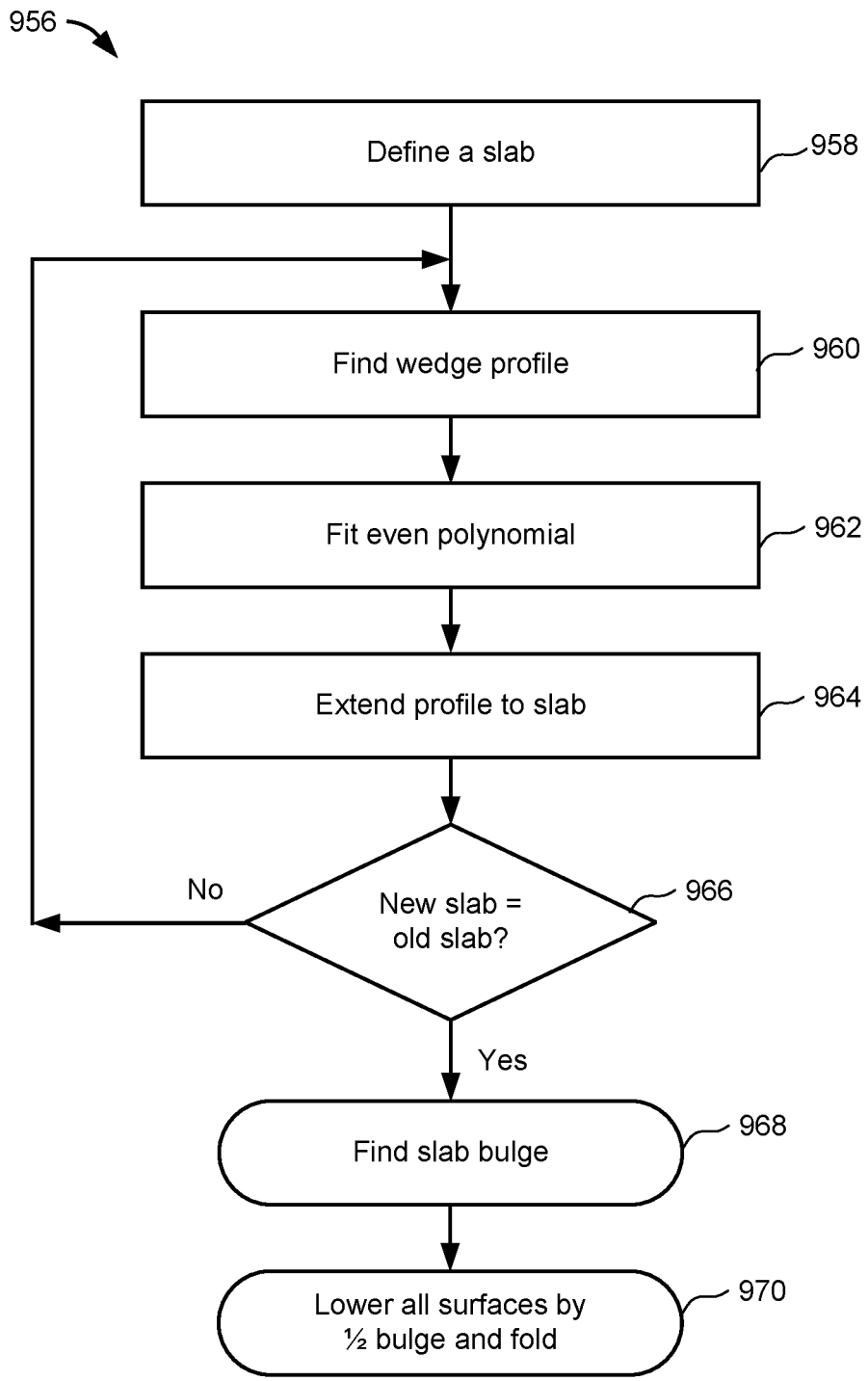
FIG. 9B is a flow chart illustrating a method of determining a structure of a wedge light guide in accordance with some embodiments.
Figure 9C:
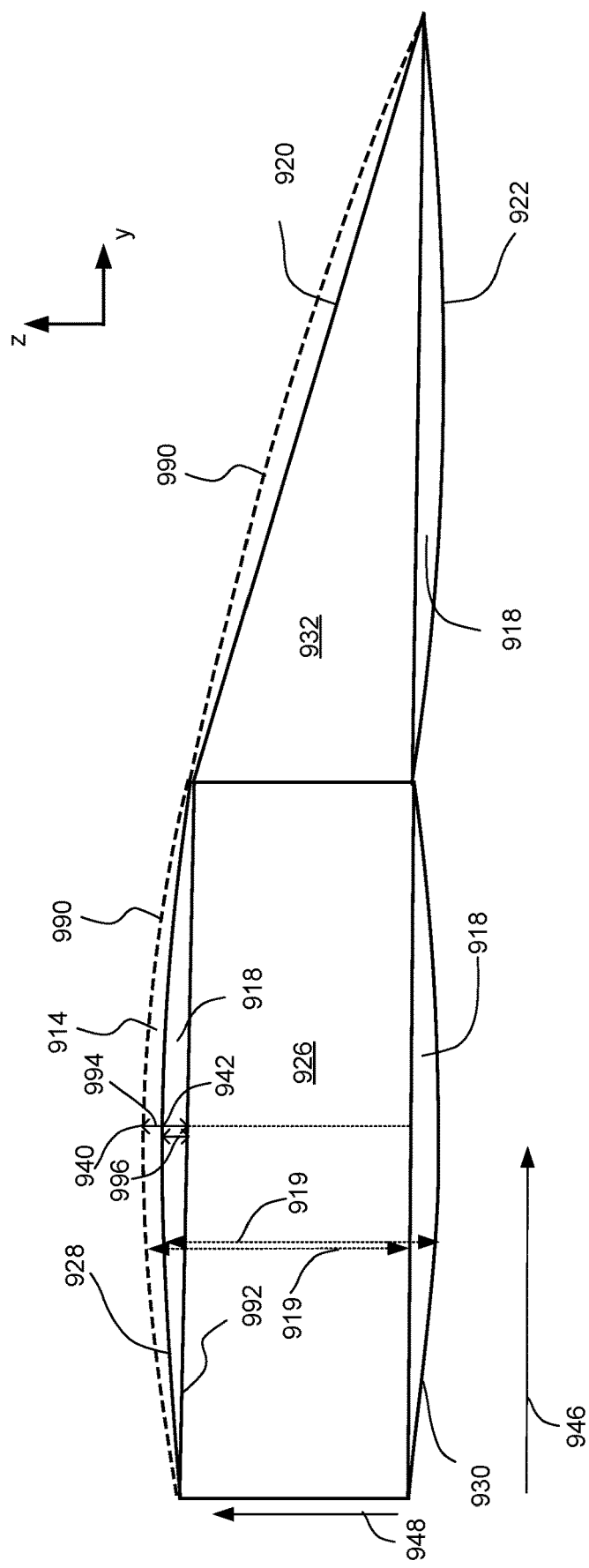
FIG. 9C is a schematic diagram illustrating redistribution of a slab bulge in accordance with some embodiments.

FIG. 9B shows a flow chart describing a method 956 for determining a shape of an optical assembly (e.g., optical assembly 986) in accordance to some embodiments. In some embodiments, the method 956 is performed by one or more processors (called herein the "processor" for brevity). At step 958, the processor defines a slab (e.g., slab 902). In some embodiments, the slab has flat top and bottom surfaces. Based on the defined slab, the processor calculates, at step 960, a surface profile of a wedge (e.g., wedge 904) abutting the slab (e.g., slab 902). The surface profile of the wedge is chosen so that rays impinging on surfaces of the slab over a range of angles exit the slab and the wedge after an equal number of reflections. At step 962, the processor fits an even polynomial to the wedge profile (e.g., surface profile of the wedge) determined at step 960. An origin of the even polynomial is placed halfway along the slab, away from the wedge 904. The polynomial is extended in step 964 over the slab, and defines a new surface for an updated slab (e.g., slab 910).

At step 966, the processor determines whether the profile of the updated slab ("new slab") substantially matches the profile of the previous slab at step 962 ("old slab"). The new slab is considered to substantially match the old slab when a root-mean-square deviation between the two surfaces is less than 5%, 4%, 3%, 2%, 1%, or 0.5%.

In accordance with a determination at step 966 that the new slab is not substantially similar to the old slab, the processor repeats the steps 960 through 964. Prior to repeating the step 960, the (old) slab profile is replaced by the new slab profile obtained at step 964. In the new iteration, the processor calculates a new wedge profile at step 960 based on the slab profile obtained previously at step 964.

In accordance with a determination at step 964 that the new slab is substantially similar to the new slab, the processor determines a slab bulge (e.g., 914) at step 968. A slab bulge (e.g., 914) defines a volume of the part of the slab (e.g., 924) located above an input thickness of the slab (e.g., slab 924).

At step 970, the processor halves the slab bulge determined at step 968, to form a half-bulge. The half-bulge is removed from the top surface of the new slab and the top surface of the wedge to form a concave wedge. The half-bulge is added to the bottom surface of the slab and the bottom surface of the wedge. Thereafter, the wedge is folded into the slab by inserting the top surface of the concave wedge in the slab. Prior to folding, the slab and the wedge share a surface (e.g., 984). After the wedge is "folded" into the updated slab, the slab and the wedge continue to share the same surface (e.g., 984). An angle between the slightly concave surface of the wedge (e.g., 920) and the shared surface (e.g., 984) remains constant after the processor "folds" the wedge into the slab.

FIG. 9C is a schematic diagram illustrating redistribution of a slab bulge in accordance with some embodiments. Halving the bulge 914 means reducing the height, measured with respect to the horizontal plane 992, at each point on the curve to half. For example, a point 940 on the even polynomial 990 is transformed to the point 942 on the surface 928 of the bulge 918. The point 940 is vertically above the point 942. The point 940 is at a height 944 from the horizontal plane 992. A height 996 represents the distance the point 942 is from the horizontal plane 992. The height 996 has half the magnitude of the height 944.

The combined surface profile of the slab and wedge provides a variation of thickness (measured along the thickness or height axis 948, measured in a direction parallel to the z-axis) as a function of length (measured along the length axis 946, parallel to the y-axis). By halving the bulge 914 and "re-distributing" the "half" bulge 918 from the top surface of the slab and the wedge to the bottom surface of the slab and the wedge, the thickness versus length of the profile is preserved as compared to a slab with the bulge 914 and a flat bottom surface (and a wedge with a flat hypotenuse facet and a flat bottom surface). For example, a thickness 919 at a particular position (e.g., a particular value of the length) on the slab is the same regardless of whether the thickness 919 is measured from (i) the even polynomial 990 to the flat bottom surface 974 or (ii) the top surface 928 to the bottom surface 930. Use of the bulges 918 allows the bottom surface 930 of the slab 926 and the bottom surface of the wedge 932 to have the same profile.

Figure 10:
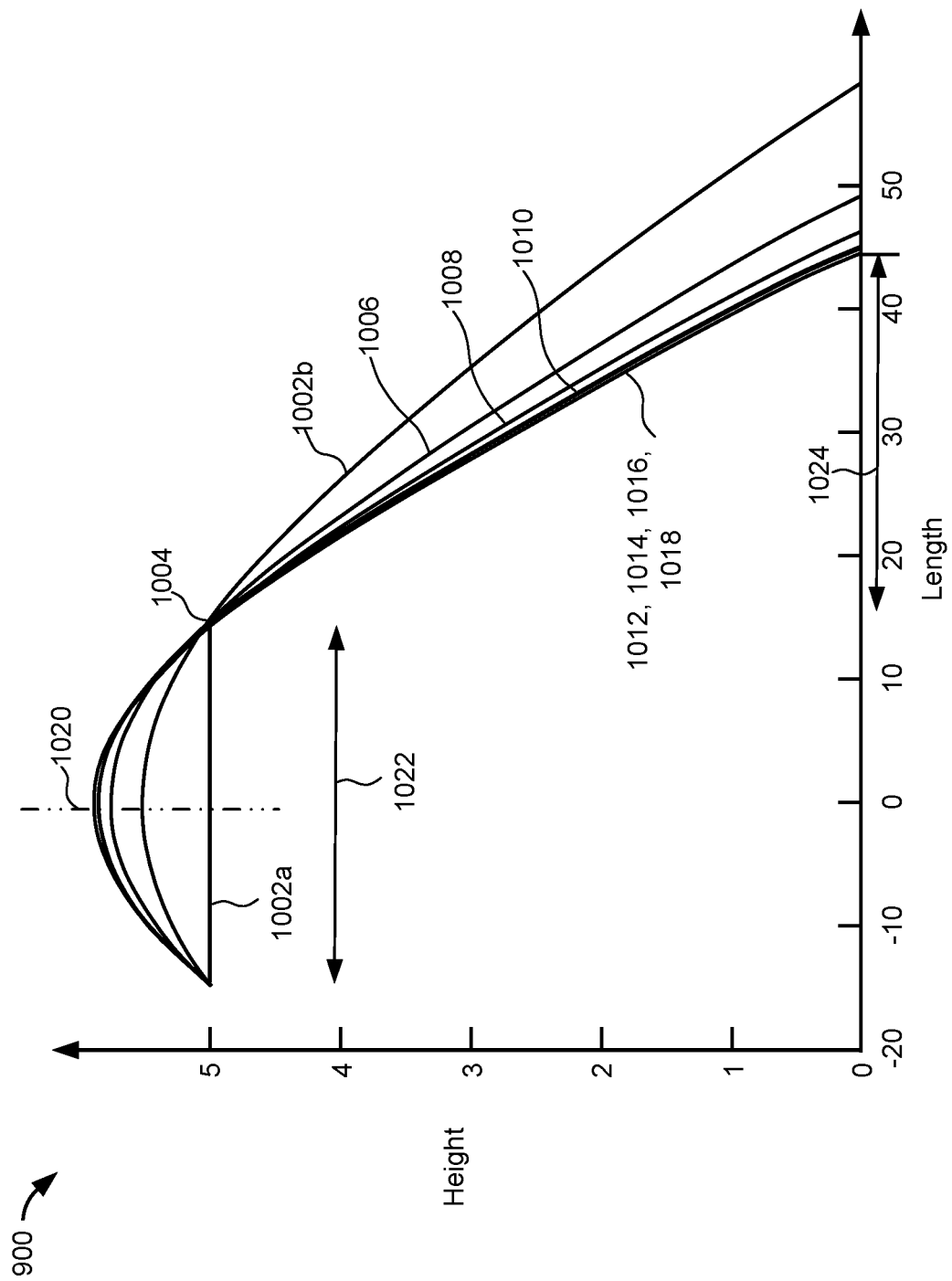
FIG. 10 shows surface profiles of a wedge light guide through iterations of the operations shown in FIG. 9B.

FIG. 10 shows surface profiles of a wedge light guide through iterations of the operations shown in FIG. 9B. In some embodiments, a first portion 1002a of a curve 1002 shows a straight line (having a constant) denoting the flat slab that is defined in the step 958 of the method 956. A second portion 1002b of the curve shows a curved line, denoting the wedge defined in the step 960 of the method 956.

A point 1004 marks the transition between the slab portion of the light guide to the wedge portion of the light guide. All the curves 1002, 1006, 1008, 1010, 1012, 1014, 1016, and 1018 passes through the point 1004. The curve 1006 shows the profile of the slab and the wedge after the first iteration.

The highest point on the curve 1006 is marked by a line 1020. The line 1020 represents an original (or a line of reflective symmetry) of the even polynomial that is used to fit the wedge. The line 1020 is in the mid portion of the slab, providing the slab with rotational symmetry. The curves from further iterations have their highest point (e.g., height) on the line 1020.

A length of the wedge shown by each of curves 1008, 1010, 1012, 1014, 1016, and 1018 may continue to decrease during the further iterations as shown in FIG. 10. In the example shown in FIG. 10, the curves converge starting at the fourth iteration (curves 1012). In some cases, the curve 1018 obtained from the seventh iteration may be used to determine the slab bulge, as described at step 968 of the method 956, although a curve obtained from a different number of iterations may be used instead (e.g., curve 1014). In some embodiments, a length 1022 of the slab associated with the final iteration and a length 1024 of the wedge associated with the final iteration are substantially similar, allowing the wedge to be folded into the slab without any overhangs. The wedge portion is folded into the slab portion, as described in step 970 of the method 956.

Figure 11:
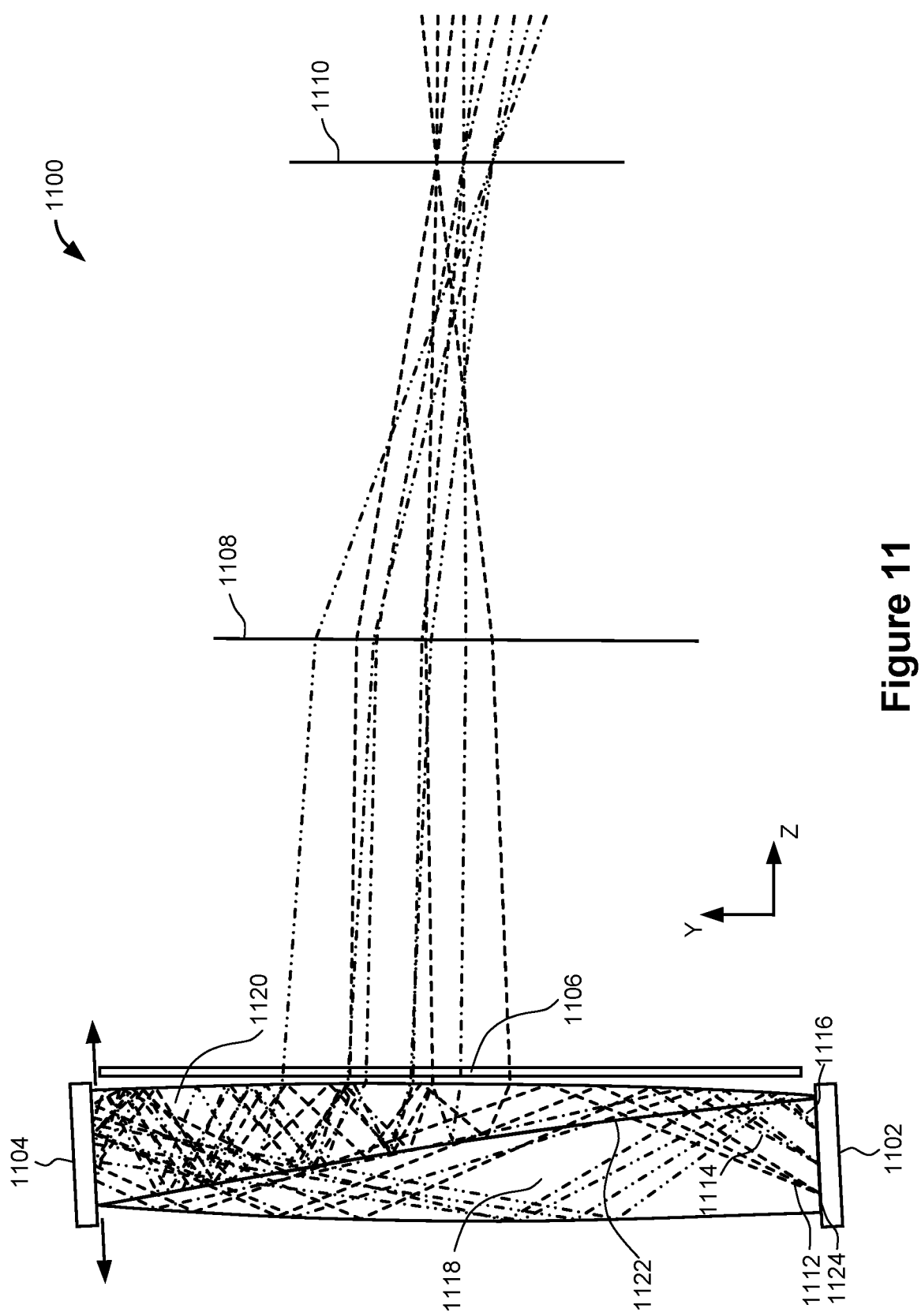
FIG. 11 is a schematic diagram illustrating a light guide in a head-mounted display device in accordance with some embodiments.

FIG. 11 shows a system 1100 that includes a light guide having a curved polarization selective redirector. The system includes a projector 1102. Three light bundles 1112, 1114, and 1116 emitted from three different locations on the projector 1102 are illustrated. Each light bundle is denoted by different line styles. Rays from the light bundle 1112 are represented using dash lines. Rays from the light bundle 1112 are represented using dash lines. Rays from the light bundle 1114 are represented using dash-dot lines. Rays from the light bundle 1116 are represented using dash-double-dot lines.

The light bundles 1112, 1114, and 1116 all have a first linear polarization that allows a polarization selective redirector 1122 to transmit the light bundles toward a top (e.g., right-most) surface of a first optical component 1120. FIG. 11 shows the light bundles alternatingly reflect between (e.g., right-most) surface of the first optical component and a bottom (e.g., left-most) surface of a second optical component 1118 until the light bundles reach a polarization rotating redirector 1104. The incident angle of the rays of the light bundles on the respective surfaces are larger than the critical angle associated with the material that forms the first optical component 1120 and the second optical component 1118. As a result, the light bundles are guided within the slab like combination of the first optical component 1120 and the second optical component.

The polarization rotating redirector 1104 redirects (e.g., reflects or diffracts) each of the light bundles to the polarization selective redirector 1122 while also rotating their linear polarization to a second linear polarization. In some embodiments, the second linear polarization is orthogonal to the first linear polarization.

The polarization selective redirector 1122 redirects (e.g., reflects or diffracts) the light bundles 1112, 1114, and 1116 toward the top (e.g., right-most) surface of the first optical component 1120, as the rays of the light bundles 1112, 1114, and 1116 have the second linear polarization. The light bundles 1112, 1114, and 1116 alternatingly reflect between the top (e.g., right-most) surface of the first optical component 1120 and the polarization selective redirector 1122 until the light bundles impinge on the top surface of the first optical component 1120 at an incident angle at (or less than) the critical angle.

Subsequently, the rays from the light bundles exit the first optical component 1120 and pass through a volume hologram 1106 that diffracts the rays toward a user's eye, positioned in a plane 1110. The rays output from the first optical component 1120 are imaged by a lens 1108 onto an image plane at the plane 1110. Three distinct points are obtained at the plane 1110, one for each bundle of light, substantially reproducing the three locations on the projector 1102 where light bundles 1112, 1114 and 1116 were emitted.

In some embodiments, the light bundles 1112, 1114 and 1116 are propagate on the y-z plane within the light guide that includes the first optical component 1120 and the second optical component 1118. In some embodiments, the volume hologram 1106, which has cylindrical focusing power, collimates the light bundles along a direction on the x-z plane.

FIG. 11 also shows that rays in all of the bundles 1112, 1114 and 1116 undergo the same number of reflections before exiting the first optical component 1120. Absent from FIG. 11 are projector optics (e.g., located between the projector 1102 and an entrance surface 1124 of the second optical component 1118), which may be used to facilitate collimation of the rays after the rays are output from the first optical component 1120.

In some embodiments, the projector 1102 is a video projector. In some embodiments, the video projector is replaced with a liquid crystal display that spans the whole of the entrance surface 1124. In some embodiments, an additional volume hologram is used to bring in illumination light to the liquid crystal display.

FIG. 12A shows a portion of a device 1200 that includes two projectors. Projectors may include liquid crystal displays and front-illuminated displays (e.g., displays that are front-illuminated by an edge-lit volume hologram). The device 1200 includes a first polarization rotating redirector 1202, a second polarization rotating redirector 1206, a first projector 1208, a second projector 1204, a first curved polarization selective redirector 1216, a second curved polarization selective redirector 1214, a first optical component 1210, a second optical component 1212, and an optical element 1222 having a redirecting surface. Due to the curvature of the first curved polarization selective redirector 1216 and the curvature of the second curved polarization selective redirector 1214, there is a region 1224 between the first optical component 1210 and the second optical component 1212. The region 1224 is formed of a material having a same refractive index as that of the first optical component 1201 and the second optical component 1212. A ray having a first linear polarization (that is transmitted through the first polarization selective redirector 1216 and the second polarization selective redirector 1214) travels through a slab like assembly formed by the first optical component 1210, the region 1224, and the second optical component 1212.

FIG. 12B shows the optical path of a ray 1226 emitted from the second projector 1204 (not depicted in FIG. 12B), while omitting rays emitted from the first projector 1208 so as not to obscure other aspects of FIG. 12B. The ray 1226 has a first linear polarization that allows it to be transmitted through the first polarization rotating redirector 1202 (not depicted in FIG. 12B). The ray 1226 reflects off a top surface 1218 of the first optical component 1210, and is transmitted through both the first polarization selective redirector 1216 and the second polarization selective redirector 1214, before reflecting off a bottom surface 1220 of the second optical component 1212. The reflected ray 1226 impinges on the second polarization rotating redirector 1206 and is redirected (e.g., reflected) as ray 1228 (shown in dotted line). The first polarization selective redirector 1216 is shown in a dash-dot line because the ray 1226 is transmitted through the first polarization selective redirector 1216.

The second polarization rotating redirector 1206 rotates a polarization of the ray 1228 upon redirecting (e.g., reflecting) the ray 1228 so that the ray 1228 has a polarization that is rotated (e.g., orthogonal) relative to that of the ray 1226. The second polarization selective redirector 1214 redirects (e.g., reflects or diffracts) the ray 1228 toward the surface 1220 of the second optical component 1212. The ray 1228 alternatingly reflects off the surface 1220 and the second polarization selective redirector 1214 until the ray 1228 strikes the surface 1220 at an incident angle that is smaller than the critical angle and emerges from the second optical component 1212 as a ray 1230. The redirecting surface of the optical element 1222 redirects (e.g., reflects or diffracts) the ray 1230 so that the ray 1230 passes through the second optical component 1212, the region 1224, and the first optical component 1210. In some embodiments, polarization of the ray 1230 is rotated back to the first linear polarization when it is redirected (e.g., reflected) by the redirecting surface of the optical element 1222. Directing the ray 1230 through the top surface 1218 of the first optical element allows the ray 1230 to be delivered, in some cases together with light from a first projector 1208, toward a user's eye. In some embodiments, the direction of the ray 1230 emerging from the surface 1218 of the first optical element is parallel to a ray 1236 (shown in FIG. 12C) that originates from a first projector 1208.

FIG. 12C shows the optical path of a ray 1232 emitted from the first projector 1208 (not depicted in FIG. 12C), while omitting rays emitted from the second projector 1204 so as not to obscure other aspects of FIG. 12C. The ray 1232 has a first linear polarization that allows it to be transmitted through the second polarization rotating redirector 1206 (not depicted in FIG. 12C). The ray 1232 is transmitted through both the second polarization selective redirector 1214 and the first polarization selective redirector 1216 before reflecting off the top surface 1218 of the first optical component 1210. The ray 1232 is transmitted through both the first polarization selective redirector 1216 and the second polarization selective redirector 1214 before reflecting off the bottom surface 1220 of the second optical component 1212. The ray 1232 alternatingly reflect off the top surface 1218 of the first optical component 1210 and the bottom surface 1220 of the second optical component 1212 until the ray 1232 impinges on the first polarization rotating redirector 1202. The first polarization rotating redirector 1202 redirects (e.g., reflects or diffracts) the ray 1232 as a ray 1234 (shown in dotted lines).

The first polarization rotating redirector 1202 rotates a polarization of the ray 1232 upon redirecting (e.g., reflecting) the ray 1232 so that the ray 1234 has a second linear polarization that is rotated (e.g., orthogonal) relative to that of the ray 1232. The ray 1234 impinges on the first polarization selective redirector 1216 and is redirected (e.g., reflected) by the first polarization selective redirector 1216 due to the ray 1234 having the second linear polarization. The first polarization selective redirector 1216 redirects (e.g., reflects or diffracts) the ray 1234 toward the surface 1218 of the first optical component 1210. The ray 1234 alternatingly reflects off the surface 1218 and the first polarization selective redirector 1216 until the ray 1234 strikes the surface 1218 at an incident angle that is smaller than the critical angle and emerges from the first optical component 1210 as a ray 1236. In some embodiments, the ray 1236 and the ray 1230 form parallel rays (of a virtual image) that are delivered to the eye of a user of the device 1200.

In some embodiments, instead of using a separate polarization rotating redirector 1202 and a second projector 1204, the second projector 1204 (e.g., spatial light modulator) functions as a polarization rotating redirector. For example, to deliver an image at 60 Hz, the second projector 1204 operates at 120 Hz alternatively emitting light (at 60 Hz with 50% duty cycle) and acting as a polarization rotating redirector (at 60 Hz with 50% duty cycle). In some embodiments, the first projector 1208 and the second polarization rotating redirector 1206 are also combined into the first projector 1204. In some embodiments, the first projector 1208 is synchronized with the second projector 1204 (e.g., operating at 120 Hz) so that when the second projector is in an "off" state (e.g., acting as a polarization rotating redirector instead of emitting light), the first projector 1208 is an "on" state (e.g., emitting light at 60 Hz with 50% duty cycle). The result of such a combination could be an image that is delivered at 120 Hz to the user. In some embodiments, the first projector 1208 and the second projector 1204 emit light of different colors (e.g., red and blue, respectively).

In light of these principles, we turn to certain embodiments.

In accordance with some embodiments, an optical device includes an optical assembly having a first end and a second end, the optical assembly including: a first optical component and a second optical component, the first optical component having at least a first optical surface, a second optical surface, and a third optical surface that are non-parallel to one another, the first optical surface being curved and extending between the first end and the second end; and a first polarization selective redirector located between the first optical component and the second optical component, and a first polarization rotating redirector disposed at the second end.

In some embodiments, the first end of the optical assembly has a first height; and a distance at the first end between the polarization selective redirector and the first optical surface of the first optical component is smaller than the first height. In some configurations, a surface profile of the optical assembly is configured to cause a first bundle of rays entering the optical assembly, over a range of angles, at the first end to undergo an identical number of reflections within the optical assembly prior to exiting the optical assembly. In some configurations, the surface profile has a 180° rotational symmetry.

In some embodiments, the first polarization selective redirector transmits rays having a first polarization and redirects (e.g., reflects or diffracts) rays having a second polarization orthogonal to the first polarization.

In some embodiments, the third surface of the first optical component is flat and the first polarization selective redirector is flat and in contact with the third surface of the first optical component.

In some embodiments, rays enter the optical assembly at an entry port defined between the first end and the second end of the optical assembly.

In some embodiments, the second optical component has at least a first optical surface, a second optical surface, and a third optical surface that are non-parallel to one another, the first optical surface of the second optical component extending between the first end and the second end, and the first optical surface of the first optical component and the first optical surface of the second optical component have a corresponding curved surface profile.

In some embodiments, the third surface of the first optical component is curved and the first polarization selective redirector is curved and in contact with the third surface of the first optical component.

In some embodiments, the second optical component has at least a first optical surface, a second optical surface, and a third optical surface that are non-parallel to one another, the first optical surface of the second optical component extending between the first end and the second end; and the optical assembly further includes a second polarization selective redirector having a shape identical to a shape of the first polarization selective redirector.

In some embodiments, each of the third optical surface of the first polarization selective redirector and the third optical surface of the second polarization selective redirector includes a concave surface.

In some embodiments, a curvature of the first polarization selective redirector is described by an even polynomial.

In some embodiments, the second optical component has at least a first optical surface, a second optical surface, and a third optical surface that are non-parallel to one another, the first optical surface of the second optical component extending between the first end and the second end; and rays entering the optical assembly at the first end alternatingly reflect off between the first optical surface of the first optical component and the first optical surface of the second optical component.

In some embodiments, the rays reflecting off the first optical surface of the first optical component is transmitted through the first polarization selective redirector before reflecting off the first optical surface of the second optical component.

In some embodiments, the first polarization rotating redirector is configured to redirect (e.g., reflect) and change a polarization of the rays.

In some embodiments, the first polarization selective redirector is configured to redirect (e.g., reflect) rays that are redirected (e.g., reflected) by the first polarization rotating redirector so that the rays redirected (e.g., reflected) by the first polarization rotating redirector alternatingly reflect off the first surface of the first optical component and the first polarization selective redirector.

In some embodiments, the optical device further includes a second polarization rotating redirector disposed at the first end of the optical assembly; a second polarization selective redirector disposed between the first polarization selective redirector and the second optical component; and a redirecting surface disposed near the first surface of the second optical component. The second polarization rotating redirector is configured to redirect (e.g., reflect) a second bundle of rays entering the optical assembly at the second end, the second bundle of rays alternatingly reflects off the first surface of the second optical component and the second polarization selective redirector, and the redirecting surface is configured to redirect the second bundle of rays that has exited the second optical component back toward the first optical surface of the first optical component.

In some embodiments, the optical device further includes a volume hologram disposed adjacent to the first optical surface of the first optical component, the volume hologram configured to redirect (e.g., diffract) rays emerging from the first optical surface of the first optical component toward a user's eye.

In some embodiments, the volume hologram has cylindrical optical power and is configured to direct the rays emerging from the first optical surface of the first optical component as parallel rays toward the user's eye.

In some embodiments, the optical device further includes a display positioned at the first end of the optical assembly, the display configured to direct rays into the optical assembly through the first end.

In accordance with some embodiments, a method of determining a shape of an optical assembly includes calculating a first number of reflections of a first ray entering a slab portion of an optical assembly at a critical angle between a first surface and a second surface prior to exiting the slab portion at a first position; determining, by extending beyond the first position, a wedge portion of the optical assembly for a plurality of pilot rays at incident angles greater than the critical angle, the wedge portion having a curved slope so that a respective one of the plurality of pilot rays exits the wedge portion of the optical assembly after the first number of reflections; and adjusting the slab portion based on the curved slope of the wedge portion to form an updated slab portion having curved first and second surfaces so that the plurality of pilot rays exits the optical assembly after the first number of reflections.

In some embodiments, adjusting the slab portion based on the curved slope of the wedge portion to form an updated slab portion comprises adding a bulge portion of the curved slope of the wedge portion to the first surface of the slab portion and the second surface of the slab portion to form the updated slab portion.

In some embodiments, the bulge portion is obtained by subtracting from the curved slope of the wedge portion a wedge having a triangular profile, a point on a base of the triangular profile coinciding with the first position. In some embodiments, an optical device includes the optical assembly having the shape determined by any method described herein; and a flat polarization selective redirector defined by a hypotenuse of the triangular profile.

In some embodiments, adjusting the slab portion based on the curved slope of the wedge portion to form an updated slab portion includes fitting an even polynomial to the wedge portion and extrapolating the even polynomial over the slab portion so that the first surface of the slab portion corresponds to the even polynomial; and the method further includes determining a bulge portion on the first surface of the slab portion; subtracting half of the bulge portion from the first surface of the slab portion; and adding the half of the bulge portion to the second surface of the slab portion.

In accordance with some embodiments, an optical device includes the optical assembly having the shape determined by any method described herein; and a curved polarization selective redirector formed by subtracting the half of the bulge portion from a slope of from the updated wedge portion. An optical device that includes the optical assembly is used to convert rays emitting from a projector into a virtual image that is delivered to a user's eye.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical device, comprising:
   an optical assembly having a first end and a second end, the optical assembly including:
      a first optical component and a second optical component, the first optical component having at least a first optical surface, a second optical surface, and a third optical surface that are non-parallel to one another, the first optical surface being curved and extending between the first end and the second end; and
      a first polarization selective redirector located between the first optical component and the second optical component, and
   a first polarization rotating redirector disposed at the second end, wherein:
      the third optical surface of the first optical component is flat and the first polarization selective redirector is flat and in contact with the third optical surface of the first optical component; and
      the second optical component has at least a first optical surface, a second optical surface, and a third optical surface that are non-parallel to one another, the first optical surface of the second optical component extending between the first end and the second end, and the first optical surface of the first optical component and the first optical surface of the second optical component have a corresponding curved surface profile.

2. The optical device of claim 1, wherein the first polarization selective redirector transmits rays having a first polarization and redirects rays having a second polarization orthogonal to the first polarization.

3. The optical device of claim 1, wherein rays enter the optical assembly at an entry port defined between the first end and the second end of the optical assembly.

4. The optical device of claim 1, further comprising a display positioned at the first end of the optical assembly, the display configured to direct rays into the optical assembly through the first end.

5. An optical device, comprising:
   an optical assembly having a first end and a second end, the optical assembly including:
      a first optical component and a second optical component, the first optical component having at least a first optical surface, a second optical surface, and a third optical surface that are non-parallel to one another, the first optical surface being curved and extending between the first end and the second end; and
      a first polarization selective redirector located between the first optical component and the second optical component, and
   a first polarization rotating redirector disposed at the second end,
   wherein the third optical surface of the first optical component is curved and the first polarization selective redirector is curved and in contact with the third optical surface of the first optical component.

6. The optical device of claim 5, wherein:
   the second optical component has at least a first optical surface, a second optical surface, and a third optical surface that are non-parallel to one another, the first optical surface of the second optical component extending between the first end and the second end; and
   the optical assembly further includes a second polarization selective redirector having a shape identical to a shape of the first polarization selective redirector.

7. The optical device of claim 6, wherein each of the third optical surface of the first polarization selective redirector and the third optical surface of the second polarization selective redirector includes a concave surface.

8. The optical device of claim 5, wherein a curvature of the first polarization selective redirector is described by an even polynomial.

9. An optical device, comprising:
   an optical assembly having a first end and a second end, the optical assembly including:
      a first optical component and a second optical component, the first optical component having at least a first optical surface, a second optical surface, and a third optical surface that are non-parallel to one another, the first optical surface being curved and extending between the first end and the second end; and
      a first polarization selective redirector located between the first optical component and the second optical component, and
   a first polarization rotating redirector disposed at the second end, wherein the second optical component has at least a first optical surface, a second optical surface, and a third optical surface that are non-parallel to one another, the first optical surface of the second optical component extending between the first end and the second end; and rays entering the optical assembly at the first end alternatingly reflect off between the first optical surface of the first optical component and the first optical surface of the second optical component.

10. The optical device of claim 9, wherein the rays reflecting off the first optical surface of the first optical component is transmitted through the first polarization selective redirector before reflecting off the first optical surface of the second optical component.

11. The optical device of claim 9, wherein the first polarization rotating redirector is configured to redirect and change a polarization of the rays.

12. The optical device of claim 11, wherein the first polarization selective redirector is configured to redirect rays that are redirected by the first polarization rotating redirector so that the rays redirected by the first polarization rotating redirector alternatingly reflect off the first surface of the first optical component and the first polarization selective redirector.

13. The optical device of claim 12, further comprising:
a second polarization rotating redirector disposed at the first end of the optical assembly;
a second polarization selective redirector disposed between the first polarization selective redirector and the second optical component; and
a redirecting surface disposed near the first surface of the second optical component, wherein:
the second polarization rotating redirector is configured to redirect a second bundle of rays entering the optical assembly at the second end,
the second bundle of rays alternatingly reflects off the first surface of the second optical component and the second polarization selective redirector, and
the redirecting surface is configured to redirect the second bundle of rays that has exited the second optical component back toward the first optical surface of the first optical component.

14. The optical device of claim 12, further comprising a volume hologram disposed adjacent to the first optical surface of the first optical component, the volume hologram configured to redirect rays emerging from the first optical surface of the first optical component toward a user's eye.

15. The optical device of claim 14, wherein the volume hologram has cylindrical optical power and is configured to direct the rays emerging from the first optical surface of the first optical component as parallel rays toward the user's eye.

* * * * *